(12) United States Patent
Park

(10) Patent No.: US 7,505,422 B1
(45) Date of Patent: Mar. 17, 2009

(54) PREFERENCE PROGRAMMABLE FIRST-ONE DETECTOR AND QUADRATURE BASED RANDOM GRANT GENERATOR

(75) Inventor: Sung Soo Park, Cupertino, CA (US)

(73) Assignee: Silicon Image, Inc., Sunnyvale, CA (US)

( * ) Notice: Subject to any disclaimer, the term of this patent is extended or adjusted under 35 U.S.C. 154(b) by 1217 days.

(21) Appl. No.: 10/645,786

(22) Filed: Aug. 20, 2003

Related U.S. Application Data

(63) Continuation-in-part of application No. 10/302,436, filed on Nov. 22, 2002, now Pat. No. 7,274,690.

(51) Int. Cl.
*H04L 12/28* (2006.01)
*G06F 15/16* (2006.01)

(52) U.S. Cl. .................. 370/256; 370/408; 709/252

(58) Field of Classification Search ............. 370/256, 370/408; 709/252
See application file for complete search history.

(56) References Cited

U.S. PATENT DOCUMENTS

| | | | | |
|---|---|---|---|---|
| 5,233,453 A * | 8/1993 | Sivarajan et al. | ............... | 398/55 |
| 5,260,935 A * | 11/1993 | Turner | ................. | 370/394 |
| 5,339,311 A * | 8/1994 | Turner | ................. | 370/394 |
| 5,390,173 A * | 2/1995 | Spinney et al. | ............. | 370/393 |
| 5,414,704 A * | 5/1995 | Spinney | ................. | 370/389 |
| 5,451,936 A * | 9/1995 | Yang et al. | ............. | 340/2.22 |
| 5,640,534 A | 6/1997 | Liu et al. | | |
| 5,801,641 A * | 9/1998 | Yang et al. | ............. | 340/2.22 |
| 5,848,297 A | 12/1998 | Krein et al. | | |
| 5,896,380 A * | 4/1999 | Brown et al. | ............. | 370/388 |
| 5,923,644 A * | 7/1999 | McKeown et al. | ......... | 370/230 |
| 6,081,507 A * | 6/2000 | Chao et al. | ............. | 370/235 |
| 6,292,491 B1 * | 9/2001 | Sharper | ................. | 370/412 |
| 6,335,930 B1 | 1/2002 | Lee | | |
| 6,370,144 B1 * | 4/2002 | Chao et al. | ............. | 370/395.42 |
| 6,389,031 B1 * | 5/2002 | Chao et al. | ................. | 370/412 |
| 6,487,213 B1 | 11/2002 | Chao | | |
| 6,594,270 B1 * | 7/2003 | Drummond-Murray et al. | .. | 370/412 |
| 6,609,222 B1 | 8/2003 | Gupta et al. | | |
| 6,674,720 B1 * | 1/2004 | Passint et al. | ............... | 370/235 |

(Continued)

OTHER PUBLICATIONS

Mailed Jun. 21, 2007 for U.S. Appl. No. 10/302,436.

(Continued)

*Primary Examiner*—Alpus H Hsu
(74) *Attorney, Agent, or Firm*—Blakely Sokoloff Taylor & Zafman

(57) ABSTRACT

A preference programmable first-one detector and quadrature based random grant generator in a crossbar switch is disclosed. The crossbar switch emulates a FIFO switching function in a single chip crossbar switch architecture that operates at a high switching speed with a large bandwidth and supports multiple QoS levels, yet do not demand an inordinately large number of input and output queues or otherwise excessively tax memory requirements. The system and method operate at a high switching speed with a large bandwidth and support multiple QoS levels, yet do not require a complex pointer management system, nor constrain switching speeds and bandwidth capacity therein. The system and method efficiently select data for switching within a crossbar switch based structure based on an urgency counter based WRR grant selection. This switching is achieved with economy of hardware by quadrature basing and quadrature preference selection.

17 Claims, 27 Drawing Sheets

U.S. PATENT DOCUMENTS

| | | | | |
|---|---|---|---|---|
| 6,816,492 | B1 * | 11/2004 | Turner et al. | 370/394 |
| 6,907,041 | B1 * | 6/2005 | Turner et al. | 370/412 |
| 6,975,638 | B1 | 12/2005 | Chen et al. | |
| 7,007,123 | B2 * | 2/2006 | Golla et al. | 710/243 |
| 7,046,687 | B1 | 5/2006 | Brown et al. | |
| 2002/0021701 | A1 | 2/2002 | Lavian et al. | |
| 2002/0051427 | A1 | 5/2002 | Carvey | |
| 2002/0085567 | A1 | 7/2002 | Ku et al. | |
| 2002/0126669 | A1 | 9/2002 | Tuck et al. | |
| 2002/0126671 | A1 | 9/2002 | Ellis et al. | |
| 2006/0007871 | A1 | 1/2006 | Welin | |

OTHER PUBLICATIONS

Mailed Jan. 17, 2007 for U.S. Appl. No. 10/302,436.

Mailed Jan. 28, 2008 for U.S. Appl. No. 10/645,787, Whole Document.

Mailed May 14, 2007 for U.S. Appl. No. 10/654,787, Whole Document.

Mailed Jul. 12, 2007 for U.S. Appl. No. 10/434,785.

Mailed Feb. 7, 2007 for U.S. Appl. No. 10/434,785.

Hashemi, Massoud R., et al., "A Multicast Single-Queue Switch with a Novel Copy Mechanism", *IEEE*, University of Toronto, (1998), 800-807.

USPTO, Mailed Jun. 13, 2008 for U.S. Appl. No. 10/645,787, Whole Document.

USPTO, Mailed Jun. 11, 2008 for U.S. Appl. No. 10/434,785, Whole Document.

* cited by examiner

5000

```
        ┌─────────────────────────┐
        │      IS THERE           │
   ┌───▶│  NEW INCOMING CELL AT IN│
   │    │      QUEUE ENTRY i?     │
   │    │         5100            │
   │    └───────────┬─────────────┘
   │                │ YES
   │                ▼
   │    ┌─────────────────────────────────────────┐
   │    │ WRITE CURRENT AgeCounter VALUE TO ENTRY I of 123 │
   │    │                  5200                   │
   │    └───────────┬─────────────────────────────┘
   │                ▼
   │    ┌─────────────────────────┐
   │    │   INCREASE AgeCounter   │
   │    │          5300           │
   │    └───────────┬─────────────┘
   │                ▼
   │    ┌─────────────────────────────────────────┐
   │    │ COMPARE AGE VALUES FOR THE ENABLED ENTRY │
   │    │            (AgeCompEn[i])               │
   │    │                5400                     │
   │    └───────────┬─────────────────────────────┘
   │                ▼
   │         ┌──────────────┐
   │         │ AgeCounter   │      NO
   ├─────────│  OVERFLOW?   │──────
   │         │    5500      │
   │         └──────┬───────┘
   │                │ YES
   │                ▼
   │    ┌─────────────────────────────────┐
   │    │ ELIMINATE CELLS WITH PHASE VALUE '00' │
   │    │             5600                │
   │    └───────────┬─────────────────────┘
   │                ▼
   │    ┌─────────────────────────────────────────┐
   │    │ MAKE PHASE CORRECTION TO EVERY EXISTING ENTRY │
   │    │                OF 123                   │
   │    │                 5700                    │
   └────└─────────────────────────────────────────┘
```

FIGURE 5B

PHASE CELL STRUCTURE FOR THREE STEP SELF ADJUSTMENT
(11 → 10 → 00 → INVALIDATE)
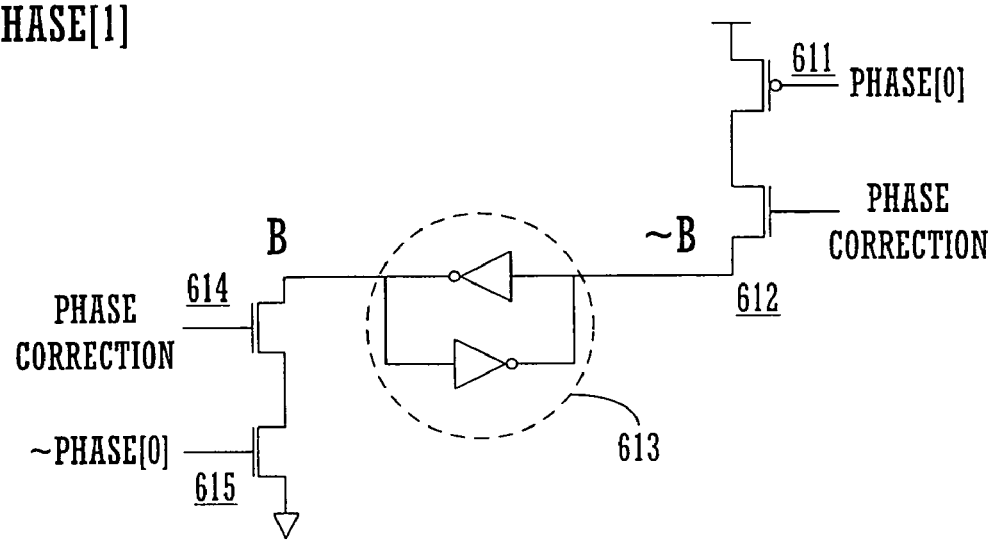
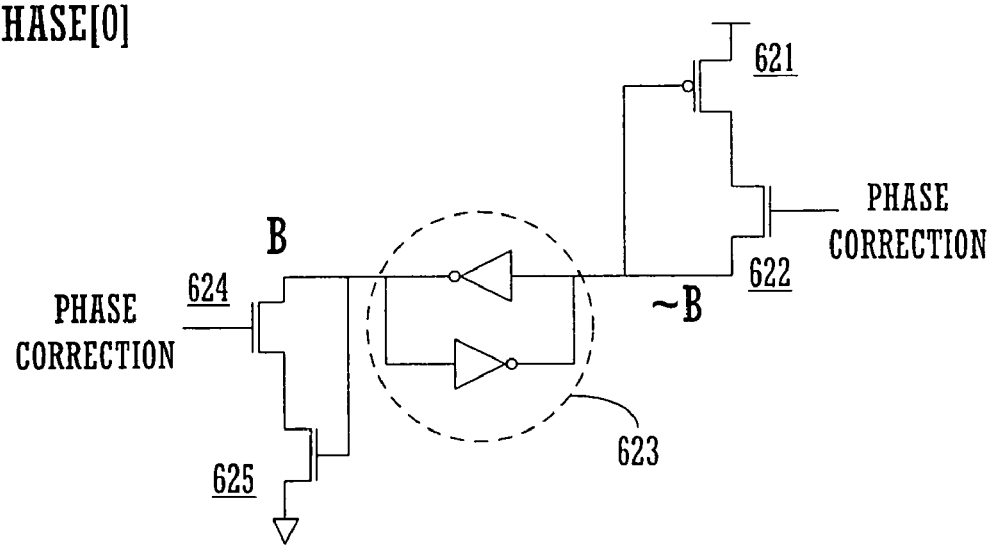
FIGURE 6

1500

```
PAYLOAD OF NEW ARRIVING Mcast CELL PLACED IN XIQ SRAM PORT 'n' ADDRESS 'i'
                                   1501
                                     ↓
ONE-SHOT CODED MCast FAN-OUT WRITTEN INTO iPRIOCAM ADDRESS 'i' WITH ITS VALID BIT CLEARED
                                   1502
                                     ↓
   ADDRESS 'i' AND Mcast CELL'S PRIORITY 'p' RECORDED IN m STORE REGISTER SET AT PORT 'n'
                                   1503
                                     ↓
         mSTORE SERVICE ORDER RESHUFFLED BASED ON PRIORITY OF NEW ENTRY
                                   1504
                                     ↓
            CONTROL MULTICAST FLOW USING mStore FIFO EMPTY BIT IN X-FRAME
                                   1505
                                     ↓
                    VALID ENTRY IN mSTORE PORT 'm'?  —— NO ——
                                   1506
                                    YES
                                     ↓
                    ASSERT MULTICAST SERVICE REQUEST 'msRqst[n]'
                                   1507
                                     ↓
CENTRAL ms GRANT GENERATOR GIVES MULTICAST SERVICE GRANT 'msGrant[n]' BY REQUEST PRIORITY
                                COMPARISON
                                   1508
                                     ↓
                    PORT 'n' GRANTED MULTICAST SERVICE?  —— NO ——
                                   1509
                                    YES
                                     ↓
ALL OF GRANT GENERATOR (GrntGen_Q1/Q2/Q3/Q4) CHANGES 'PREFERENCE POINTER' VALUE TO 'n' AT
        NEXT sCLK TO GIVE GRANT TO MULTICAST SERVICE GRANTED IMPORT
                                   1510
                                     ↓
MRqstGen REGISTER IN iPrioCam SET TO GENERATE REQUEST SIGNALS FOR EACH FAN-OUT OF SELECTED
                              MULTICAST CELL
                                   1511
```

FIGURE 12

BRRT CELL WITH SINGLE GRANT

PREFERENCE PROGRAMMABLE FIRST-ONE DETECTOR AND QUADRATURE BASED RANDOM GRANT GENERATOR

RELATED UNITED STATES APPLICATION

This application is a continuation-in-part of U.S. patent application Ser. No. 10/302,436, entitled "An Age Selection Switching Scheme for Data Traffic in a Crossbar Switch," with filing date Nov. 22, 2002, now U.S. Pat. No. 7,274,690 by Sung Soo Park, et al., and assigned to the assignee of the present application, and which, to the extent it is not repeated, is hereby incorporated herein by reference.

TECHNICAL FIELD

Embodiments of the present invention relate to the field of data switching. More specifically, embodiments of the present invention relate to a preference programmable first-one detector and quadrature based random grant generator in a crossbar switch.

BACKGROUND ART

Recent applications of packet based IP switching technology have extended to many areas, such as mobile infrastructure, Multi-Service Provisioning Platform (MSPP), high-speed Internet routers, Storage Area Network (SAN) equipment, and high-definition television. The current demand for higher bandwidth across the global network is driving a need for higher performance and higher port counts in "next generation" switching solutions.

Many of these high-speed switches are built around a crossbar architecture because of its speed and simplicity. Due to switching speed limitations, crossbar based architectures typically use input queues to hold packets or cells waiting to be transferred. A typical switching scheme applies the well known first in/first out (FIFO) regime to prioritizing the transfers from these queues. However, such simple FIFO input queues inherently suffer diminished performance because of head of line (HOL) blocking.

HOL blocking can be eliminated by applying a virtual output queue (VOQ) FIFO structure, but this poses strenuous demands on memory size. One such demand is that a VOQ FIFO architecture requires a memory size to grow according to the square of the number of port increases. Another such memory demand is presented by the per-flow queuing for quality of service (QOS).

The provision of QOS demanded by modern, advanced-architecture network systems requires the isolation of specific traffic flows among multiple flows, and each specific flow needs to have its own behavior characteristics and service level. A prerequisite for such isolation typically requires separate FIFO implementation for each flow. Together, the need for separate VOQ FIFOs for each QOS priority can drive a switch fabric solution to hundreds of chips. Therefore, providing enough memory within the switching function becomes a costly bottleneck for next generation switch fabric chip set vendors.

This can be illustrated by the following example. For a 32-port switch fabric with 32 priorities, 1024 FIFOs (32 destinations times 32 priorities) are required per port for per-flow QOS support and for elimination of HOL blocking. If the fixed cell size of 64 bytes is used and the cell depth of each VOQ is 64, then the overall memory requirement for the switch fabric system is 128 Mbytes (1024 VOQs times 64 cells per queue times 64 bytes per cell times 32 ports).

This huge memory size would be extraordinarily difficult and expensive, and perhaps impossible with contemporary processing technologies, to integrate into a cost effective, single chip solution. Thus, another approach should be taken to achieve small die size but without sacrificing performance. Examining actual internet traffic indicates that average usage of this huge input buffer can be as low as less than 2% at 99% full input traffic rates. This low actual memory utilization rate offers opportunity for a different approach. However, taking advantage of the low actual memory utilization rate is problematic using conventional crossbar architectures.

Conventional crossbar architectures utilize separated queues for the detection and scheduling of cell transfer. This is problematic because of the large capacity, speed, and addressability demands made on memory resources and/or the large memory size such an approach requires, as discussed above. Further, even conventional crossbar switch architectures made with memories of capacity and addressability sufficiently large to accommodate such demands can pose other complicating problems.

Even for conventional crossbar switch architectures made with memories of capacity and addressability sufficiently large to accommodate the demands of detection and scheduling of cell transfer, implementing a FIFO regime thereon requires a pointer functionality to nominate and designate cells for transfer. The pointer functionality requires a pointer as well as a management system and/or process for its control. Implementing a FIFO regime with a large memory in a crossbar switch demands a complex pointer management system, which is difficult and expensive to implement in conventional technology.

A further problem with conventionally implementing crossbar switch architectures made with memories of capacity and addressability sufficiently large to accommodate the demands of detection and scheduling of cell transfer is that of retarded speed. The switching speeds of such conventional crossbar switch architectures are constrained by the addressability and size of the memory they field.

For a conventional 32 port crossbar switch with 32 inputs and 32 outputs utilizing conventional binary round robin selection schemes for switching four quadrants of eight ports each, a complex grant generator structure must be provided to service each quadrant. Provision of a complex grant generator structure for each quadrant demands a large amount of hardware resources. Large hardware resource demands are expensive and require resources that are not then available for other uses.

The conventional art is problematic therefore because memories of sufficient capacity and addressability for implementing a FIFO switching function in a crossbar switch using conventional architectures therefore are difficult and expensive to achieve, especially to support more than one QoS level, and in a single integrated circuit (IC; e.g., chip). The conventional art is also problematic because even if an adequate memory is achieved, the FIFO switching function of such a crossbar switch requires a complex pointer management system. Further, the conventional art is problematic because crossbar switches so constructed may operate at less than optimal switching speeds and bandwidths. These problems characterizing conventional crossbar switches are exacerbated when data is to be switched in multiple quadrants. Separate hardware is required conventionally for each quadrant. This is expensive and removes hardware resources from availability for other purposes.

SUMMARY OF THE INVENTION

What is needed is a system and/or method for emulating a FIFO switching function in a single chip crossbar switch architecture that operates at a high switching speed with a large bandwidth and supports multiple QoS levels, yet does not demand an inordinately large number of input and output queues or otherwise excessively tax memory requirements. What is also needed is a system and/or method for emulating a FIFO switching function in a single chip crossbar switch architecture that operates at a high switching speed with a large bandwidth and supports multiple QoS levels that does not require a complex pointer management system. What is further needed is a system and/or method for emulating a FIFO switching function in a single chip crossbar switch architecture that achieves the foregoing without constraining switching speeds and bandwidth capacity therein. Further still, what is needed is a system and/or method that can efficiently provide quadrature based switching selection without requiring a separate grant generator structure for each and every quadrant. Yet further still, what is needed is a system and/or method that conserve hardware resources while providing quadrature based switching selection.

A system and method for an age selection switching scheme for data traffic in a crossbar switch is disclosed in one embodiment herein that emulate a FIFO switching function in a single chip crossbar switch architecture that operates at a high switching speed with a large bandwidth and supports multiple QoS levels, yet do not demand an inordinately large number of input and output queues or otherwise excessively tax memory requirements. A system and method are also disclosed in one embodiment herein that emulate a FIFO switching function in a single chip crossbar switch architecture that operates at a high switching speed with a large bandwidth and supports multiple QoS levels, yet do not require a complex pointer management system. A system and method are further disclosed in one embodiment herein for emulating a FIFO switching function in a single chip crossbar switch architecture that achieves the foregoing without constraining switching speeds and bandwidth capacity therein. Further still, a system and method are disclosed that efficiently provide quadrature based switching selection without requiring a separate grant generator structure for each and every quadrant. Yet further still, a system and method are disclosed that efficiently conserve hardware resources while providing quadrature based switching selection.

A content addressable merged queue (camQ) architecture for high-speed switch fabric solutions is disclosed. The architecture reduces the memory requirement for input and output queues for crossbar switches significantly by the use of special content addressable memory (CAM) cells and age tag comparators. These are implemented within a single chip. In one embodiment, camQ behaves functionally like VOQ FIFO for each supporting priority. Thus, camQ eliminates HOL blocking. In one embodiment, camQ also embraces a scheduler and crossbar within the chip, supporting TDM traffic and multicast traffic also. In one embodiment, structure is independent of the number of support priorities. In one embodiment, many QoS levels are provided, while remaining cost effective at higher traffic bandwidth limits.

Unlike conventional separated queues for the detection and scheduling of cell transfer, camQ architecture is comprised of small payload static random access memory (SRAM), Content Addressable Memory (CAM) for priorities and destinations of the cells in the payload SRAM, and age tag comparators. CAM cells store payload destinations for cells, which can be addressed by cell priorities. Once a priority for the quality of service is decided, all the cells with the selected priority in the payload can make their connection requests to the destination ports directly through the CAM structure. This avoids HOL blocking by the cells ahead whose destination was blocked for some reason.

The VOQ First-Come-First-Serve (FCFS) function of is supported without the conventionally required complex pointer management system for FIFO. Instead, in one embodiment, camQ assigns an age tag to each incoming cell. Fast age tag comparators then effectuate the FCFS feature of switch fabric by selecting the oldest cell.

Returning to the above example of 32 ports and 32 priorities, the total memory capacity using the camQ approach of one embodiment requires only 64 Kbyte payload SRAM (32 input ports times 32 depth/ports times 64 byte cell size) for its 32 input buffers. The small sizes for CAM memory and comparators advantageously prevent the conventionally common bottlenecking of data in ingress and egress queues, facilitating single chip integration.

Further, the small size on-chip input queues yield the added benefit of increased switching speed. In one embodiment, camQ architecture is implemented to schedule at twice the rate of the line speed. This effectuates a combined input and output queued (CIOQ) crossbar architecture. In one embodiment, an N×N CIOQ has a switching speed of 2−(1/N), and thus emulates an N×N FIFO output queue switch.

In one embodiment, an age comparison system compares the relative ages of data cells to be switched. The age comparison system compares the ages and selects data cells for switching based on their age, such that older cells are selected for switching prior to younger data cells. A phase correction function adjusts the ages of aging data cells and automatically deletes stale data by eliminating cells that have not been switched and that are beyond a certain maximum age.

In one embodiment, a method for scheduling data cells for switching interleaves the relative ages of data cells with their relative priorities. In one embodiment, an interleaved age-priority switching vector is generated. In one embodiment, the interleaved age-priority vector has a dynamically reconfigurable bit order, to accommodate service updates. In one embodiment, an age comparison scheme prioritizes data cells for export after switching according to their relative ages.

In one embodiment, a system and method for a preference programmable first-one detector and quadrature based random grant generator in a crossbar switch are provided. A Binary Round Robin Tree (BRRT) provides the quadrature based random grant generator. A preference pointer activates each quadrant for switching service selection according to an urgency counter selection. Actual count values serve as tie-breakers. This saves hardware resources for availability for other purposes and is less expensive than conventional switching selection, because a separate complex grant generator structure is not required for each and every quadrant.

BRIEF DESCRIPTION OF THE DRAWINGS

The accompanying drawings, which are incorporated in and form a part of this specification, illustrate embodiments of the invention and, together with the description, serve to explain the principles of the invention:

FIG. 5B is a flowchart of the steps in a process for comparing packet ages in an ingress side age comparator, according to an embodiment of the present invention.

FIG. 6 depicts a phase cell structure that effectuates three step self adjustment, in accordance with one embodiment of the present invention.

FIG. 12 is a flow chart of a multicast service request process, according to an embodiment of the present invention.

DETAILED DESCRIPTION OF THE INVENTION

A preference programmable first-one detector and quadrature based random grant generator in a crossbar switch is disclosed. In the following detailed description of the present invention, numerous specific details are set forth in order to provide a thorough understanding of the present invention. However, it will be recognized by one skilled in the art that the present invention may be practiced without these specific details or with equivalents thereof. In other instances, well known methods, procedures, components, and circuits have not been described in detail as not to unnecessarily obscure aspects of the present invention.

Notation and Nomenclature

Some portions of the detailed descriptions, which follow, are presented in terms of procedures, steps, logic blocks, processing, and other symbolic representations of operations on data bits that can be performed by electronic systems. These descriptions and representations are used by those skilled in the electronic arts to most effectively convey the substance of their work to others skilled in the art. A procedure, system executed step, logic block, process, etc., is here, and generally, conceived to be a self-consistent sequence of steps or instructions leading to a desired result. The steps are those requiring physical manipulations of physical quantities. Usually, though not necessarily, these quantities take the form of electrical signals capable of being stored, transferred, combined, compared, and otherwise manipulated in an electronic system. It has proven convenient at times, principally for reasons of common usage, to refer to these signals as bits, values, elements, symbols, characters, terms, numbers, or the like.

Figure 1:
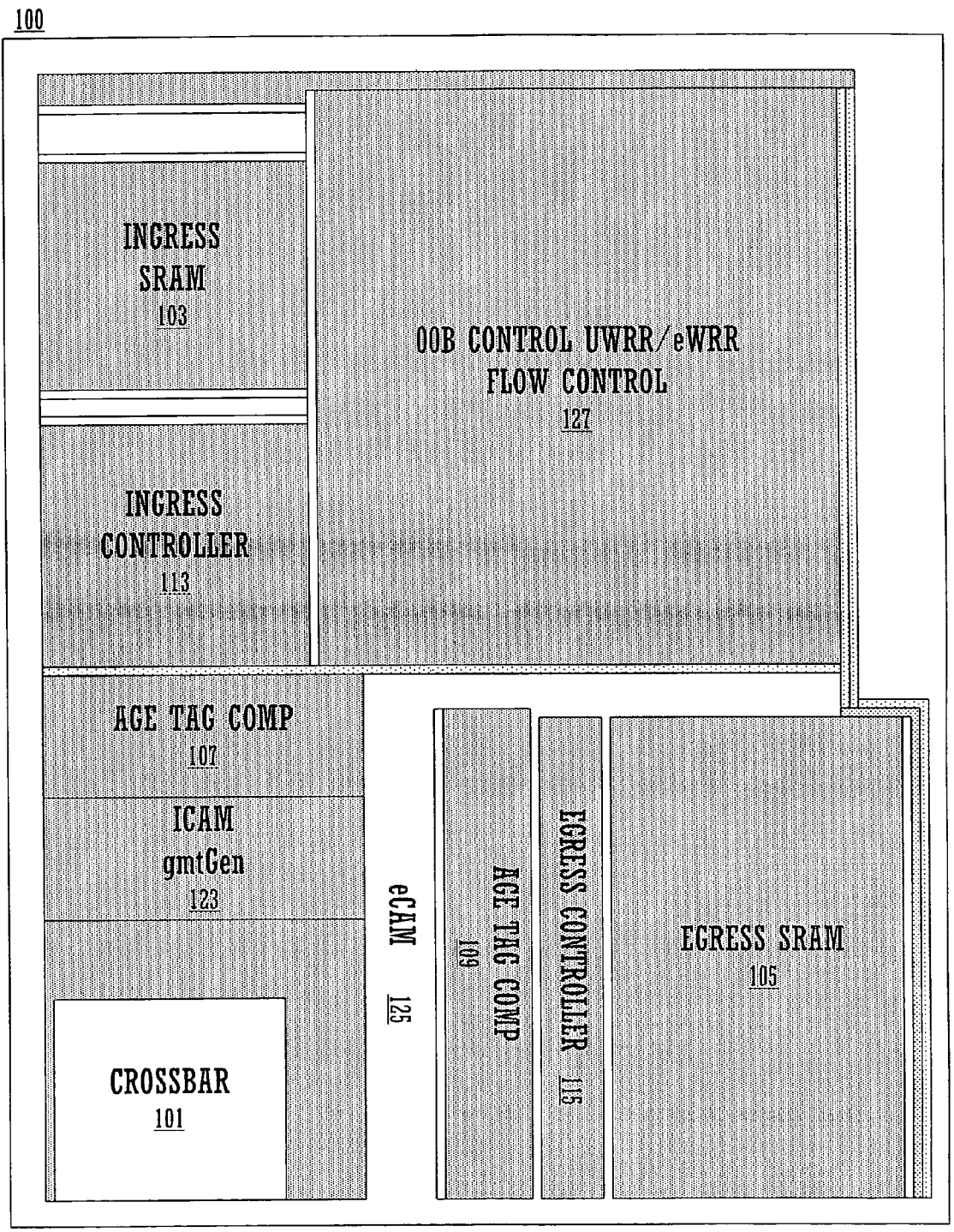
FIG. 1 is a block diagram of an 8-port quadrant of an exemplary 32-port crossbar switch featuring a camQ architecture, in accordance with one embodiment of the present invention.
Figure 20:
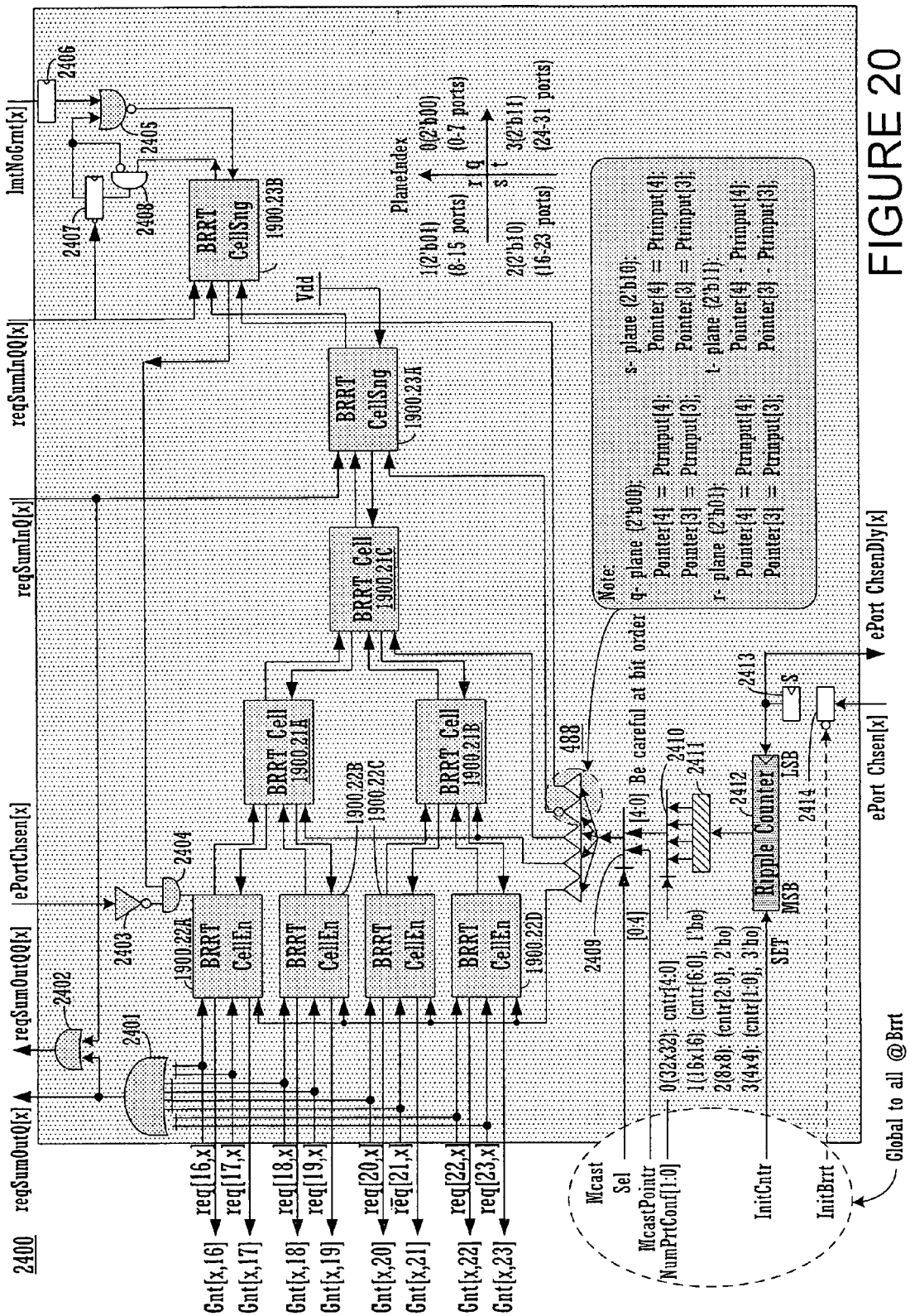
FIG. 20 depicts a quadrature based BRRT structure, according to an embodiment of the present invention.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "multicasting," "comparing," "determining," "storing," "receiving," "registering," "arranging," "asserting," "granting," "controlling," "configuring," "selecting," "reading," "prioritizing," "writing," "preventing," "generating," "shuffling," "re-shuffling", "performing," "queuing," "requesting," "extracting," "launching," "selecting," "servicing", "switching", "transferring", "updating", or the like, refer to the action and processes of an electronic system (e.g., systems 100, 2400; FIGS. 1, 20, respectively), or similar electronic system, that manipulates and transforms data represented as physical, e.g., electrical quantities within the systems' queues, registers, and memories into other data similarly represented as physical quantities within the systems' queues, memories, or registers or other such information storage, transmission, or display devices.

Further, embodiments of the present invention may be discussed in terms of processes. For example, FIGS. 12, 13, 14, and 22 depict processes 1500, 1700, 1800, and 2600, respectively, performed in accordance with embodiments of the present invention for age comparison. Although specific steps are disclosed in FIGS. 14A, 15-18, and 26 describing the operations of these processes, such steps are exemplary. That is, embodiments of the present invention are well suited to performing various other steps or variations of the steps recited in the flowcharts herein.

Section I

Embodiments of the present invention are directed to a preference programmable first-one detector and quadrature based random grant generator in a crossbar switch. The description of the a preference programmable first-one detector and quadrature based random grant generator in a crossbar switch commences at Section II at FIG. 19. Presented first, Section I, FIGS. 1-18 represent a discussion of the crossbar switch platform deploying a content addressable merged queue architecture and method of multicast service therein, to provide context to the discussion of the preference programmable first-one detector and quadrature based random grant generator in a crossbar switch.

Exemplary Crossbar Switch Platform Deploying CamQ Architecture

FIG. 1 depicts an 8-port quadrant 100 of an exemplary 32-port crossbar switch featuring a camQ architecture, in accordance with one embodiment of the present invention. Quadrant 100 exemplifies a content addressable merged queue (camQ) architecture for high-speed switch fabric solutions. This architecture reduces the capacity, which would otherwise be required for input and output queues for crossbar switches significantly. This reduction in memory requirements is effectuated by the use of small payload SRAM in ingress SRAM (iSRAM) 103 and egress SRAM (eSRAM) 105, and special content addressable merged (CAM) memory cells for priorities and destinations of the cells in the payload SRAM (e.g., iSRAM 103 and eSRAM 105), as well as by deployment of age tag comparators 107 and 109. The CAM cells are deployed in ingress CAM (iCAM) 123 and egress CAM (eCAM) 125.

The CAM cells in the iCAM 123 and eCAM 125 store the payload destinations of cells, which can be addressed by cell priorities. Once a priority for the quality of service is decided, all the cells with the selected priority in the payload can make their connection requests to the destination ports directly through iCAM 123 and eCAM 125. Advantageously, this avoids HOL blocking by the cells ahead whose destination was blocked for some reason. Ingress age tag comparator 107 assigns an age tag to each incoming cell. Egress age tag comparator 109 selects the oldest cell and assigns it an age urgency. Age tag comparators 107 and 109 thus effectuate a FCFS feature for the crossbar switch fabric 101.

Traffic through crossbar component 101 is controlled in one embodiment by a dual age-priority (AP) switching process (e.g., process 1200; FIG. 12). Traffic into ingress SRAM 103 is controlled by ingress controller 113. Traffic for export via egress SRAM 105 is controlled by an egress controller 115. An urgency based weighted round robin (UWRR) flow controller 127 handles connection requests and correspondingly schedules and controls fabric traffic, based in part on the age urgency assigned by egress age comparator 109. Cells are granted connection by grant generator 129.

In one embodiment, the camQ architecture 100 switches at a speed that is twice that of the line speed, thus effectuating a combined input and output queued (CIOQ) crossbar architecture. In the present embodiment, the 32×32 CIOQ camQ architecture 100 with its switching speed of 2-(1/32) emulates a 32×32 FIFO output queue switch. In one embodiment, timing sequences characterizing the operation of camQ architecture 100 help to effectuate this and other features.

Exemplary Operational Clocking and Priority Selection

Exemplary Clocking

Figure 2:
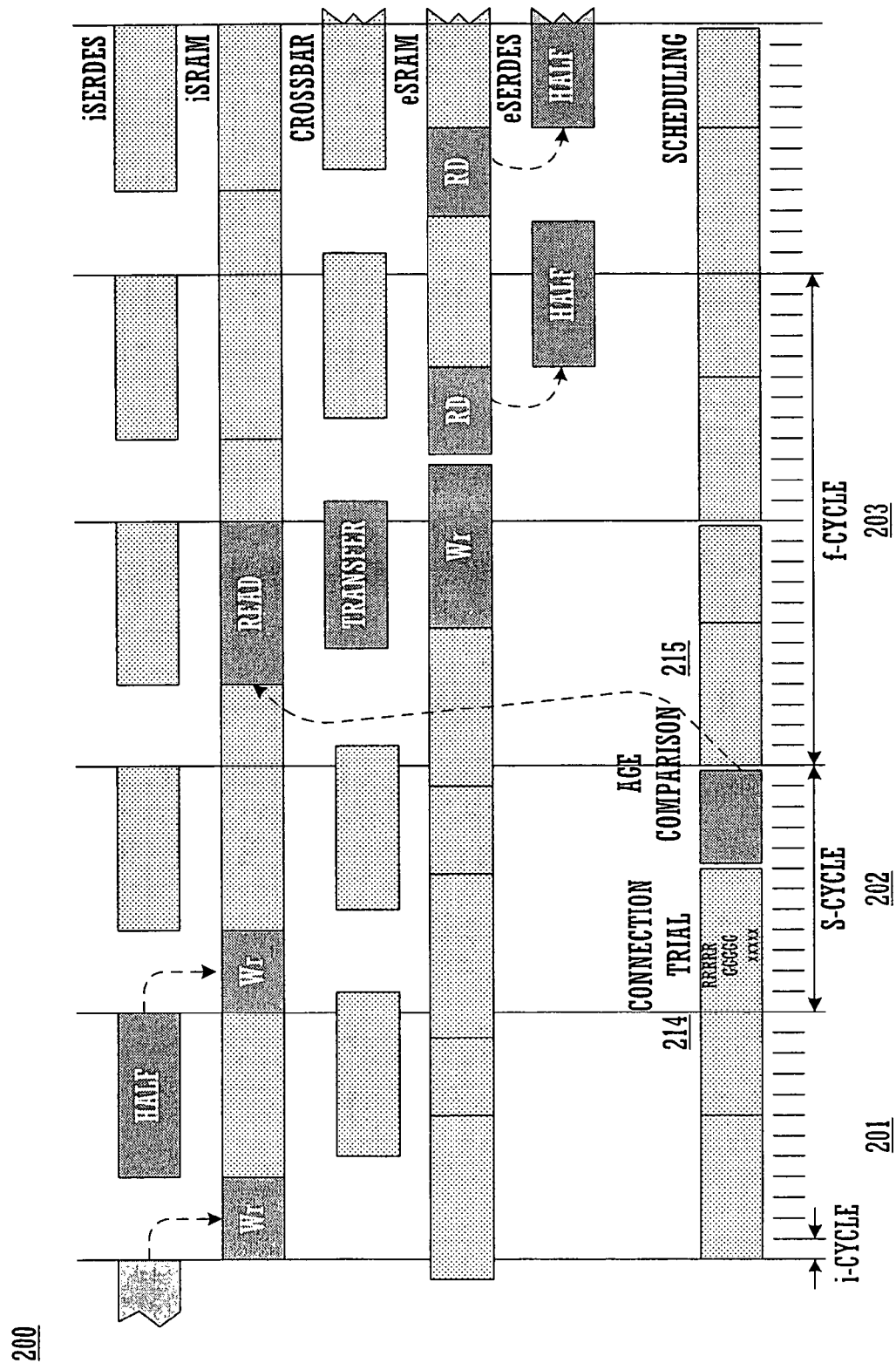
FIG. 2 depicts a clock relationship by which a camQ switching functionality operates, in accordance with one embodiment of the present invention.

With reference to FIG. 2, a timing sequence 200 depicts the sequence of operation of a camQ architecture, according to one embodiment of the present invention. In the present embodiment, three different clock cycle speeds are operational. These include the i-cycle 201, the s-cycle 202, and the f-cycle 203. Incoming cells are synchronized to f-cycle 203 at the rate of one cell per f-cycle 203. Considering overheads, such as 8b10b encoding, cell boundary synchronization, and cell header information (including cell ID, in-band flow control, cell priority and destination), approximately 15 Gbps of serial link bandwidth is required for an actual 10 Gbps of payload traffic in an OC-192 data rate. In the present embodiment, internal data parallelism and high-speed 500 MHz internal clocking effectuate 64-byte cell framing at the 20 MHz rate of f-cycle 203.

Transferal of cells to an output queue is based on s-cycle 202. In the present embodiment, s-cycle 202 operates at twice the speed of f-cycle 203. Thus, two cells can be transferred through the crossbar (e.g., crossbar 100; FIG. 1) per one f-cycle 203. The effective internal payload switching bandwidth of the crossbar is thus 20 Gbps per port. In as much as the entire cell reading and transferring are done at on-chip SRAM (e.g., iSRAM 103, eSRAM 105; FIG. 1), the 20 Gbps internal bandwidth is supported (64 bit read per 2 nsec equals 32 Gbps).

During one s-cycle 202, there are five connection trials 214 to output queues based on the fastest clock, which is i-cycle 201. When a cell successfully gets connection to its destination, there follows an age tag comparison 215 for the selection of the oldest cell with the destination. All of the connection trials 214 and age comparisons 215 are completed within a single s-cycle 202.

In one embodiment, connection trials are repeated where previous trials did not succeed until successful. In one embodiment connection trials are repeated until successful, or until up to five connection trials have been unsuccessfully completed in an s-cycle 202. In another embodiment, connection trials are repeated until successful, or until some other number of connection trials have been unsuccessfully completed in an s-cycle 202. Each subsequent connection trial is run for egress ports, which have not been connected for the cell transfer. Thus, the probability for connection trial success is smaller than for earlier trials. In one embodiment, the success rate for connection trails can approximate 77% at the first trial with 100% traffic loading of bernoulli_iid_uniform input, while only 1.4% of the connections may succeed at the fifth trial with the same condition. In one embodiment, extending connection trials beyond five, with even lower probabilities of successful connection (and significance), are forgone. Advantageously, this conserves resources. In another embodiment, more than five connection trials can be performed in an s-cycle 202.

During the connection trial, the priority level of the cells is decided. Connection requests are generated accordingly and made to a grant generator (e.g., grant generator 129; FIGS. 1, 3A). One embodiment achieves the advantage of higher performance with a weighted round robin (WRR) based priority selection, a process known in the art. In another embodiment, other selection schemes are used, such as strict priority based selection. Conventional WRR based priority selection algorithms would give to each cell the same chance of selection if the accumulated weight is greater than certain one criterion, a term known in the art. The WRR based priority selection process employed by an embodiment of the present invention however applies additional criteria in its selection process, e.g., the number of different available trial slots and the urgency level associated therewith.

Urgency Based Priority Selection

In the present embodiment, e.g., five different trial slots each have different success probabilities. Thus, the present embodiment assigns multiple urgency levels for WRR selection criteria. This urgency based WRR (UWRR) works with five different levels of selection criteria, called urgency levels. At each of the five connection trials, the trial will be made only for the priorities that have higher urgency level than a pre-determined urgency value of that trial slot. The higher the urgency level, the earlier its corresponding connection trial will be made.

Each of 32 priority levels will be mapped to these urgency levels with a different initial urgency. As a pre-determined period passes by without any connection success, the corresponding urgency increases. The priority selection for the connection trial is done by Round-Robin manner among the priorities with the same urgency level. Unlike conventional WRR, UWRR does not make any connection request even if it has a cell with higher priority. In return, advantageously, this lack of a request (e.g., forestalling on generating one) effectively guarantees higher connection success rates for more urgent requests from other ports. One embodiment operates in a time division multiplexing (TDM) support mode. In the TDM support mode, TDM cells use the first connection request stage, virtually assuring that the connection will succeed for that TDM cell.

Output Buffer Considerations

Even if cells can be sent to their egress destinations two times faster than its line speed within a chip, it is not easy conventionally for the switch fabric chip to send the egress cells to the outside world at that higher rate. Usually, the line speed is limited by the serializer-deserializer (SERDES) performance, and both ingress and egress SERDES circuits work at the same speed. The Traffic Manager or NPU may not be able to handle two times faster traffic input either, by its lack of processing capability. If there is temporary over-subscription to a certain destination, the egress cells begin to stay at the output buffer. Embodiments of the present invention however, effectuate handling switching traffic at twice line speed.

One embodiment treats the egress traffic bandwidth to be the same as ingress traffic bandwidth. The present embodiment implements simple output buffers, because there is no need for connection scheduling there. These output buffers thus accord an advantageous place for implementing QOS control in the present embodiment. Whereas conventionally, separated priority FIFOs in output queue buffers implement QOS control, the present embodiment uses the same priority CAM and age tag comparison structure to maximize the output buffer usage. No destination field exists in the egress CAM. The QOS cell selection at the output buffer is scheduled with relative ease. Priority for launching cells is assigned by simple WRR. This assigned priority is given to the CAM and the age tag comparator. The CAM and age tag comparator then decide a specific corresponding cell with that priority.

In the present embodiment, the output queue is implemented on the order of four times deeper, relative to conventional art. Burst destined traffic is thus handled expeditiously in the output queue. Further flooding of cells to a certain egress buffer causes "back-pressure" to the ingress side traffic managers. This back-pressure stops further cells from being sent to the specific destination port. Further, the presence of this back-pressure is broadcast to other ingress traffic managers by an egress cell header. The present embodiment thus effectuates in-band "per-destination" flow control.

Exemplary Performance Model

With the camQ architecture as an input queue, one embodiment of the present invention displays properties including average cell latency per priority, buffer overflow, and jitter that are superior to conventional VOQ FIFO performance. In the following discussion, modeling the performance of switching architecture is achieved by ignoring the latency of SERDES circuits.

To compare the performance of a 32 depth camQ structure (e.g., camQ structure 100; FIG. 1) with a conventional VOQ FIFO structure, a 64 depth conventional VOQ FIFO using an ingress serial line internet protocol (iSLIP) as a VOQ scheduling algorithm with the iteration number of 2 per each priority (total 8 iterations for 4 priorities) is also modeled. The iSLIP with 32 priorities yields an unrealistic 64 iterations. Thus, for the present comparison, only four priorities are assumed for the conventional iSLIP model.

One dichotomy becomes readily apparent in comparing the memory requirements of the present embodiment with that of the conventional model. For instance, the resulting conventional VOQ input buffer size is 512 Kbyte per port. For a conventional VOQ function supporting 32 priorities, 4.0 Mbyte of memory is demanded per port. In comparison, a 32-depth camQ architecture according to the present embodiment requires only 2 Kbyte per port, an advantageous saving of 2,000:1 over the conventional art.

Further comparative results between the camQ architecture of the present embodiment and a conventional VOQ FIFO architecture, including latency, overflow, and buffer usage at a mean length of 20 of bursty traffic, and with a loading of 99 percent (terms known in the art) are summarized in Table 1 below. For modeling of the present embodiment so as to observe camQ performance as an input queue, no back-pressure is assumed from the output buffer on either the conventional VOQ or the camQ architecture.

TABLE 1

COMPARISON OF LATENCY, OVERFLOW AND BUFFER USAGE BETWEEN CAMQ OF THE PRESENT EMBODIMENT AND CONVENTIONAL VOQ-FIFO

| | | CAMQ | VOQ FIFO (conventional) |
|---|---|---|---|
| Latency | Priority 0 | 1 (1) | 8 (32) |
| (Jitter) | Priority 3 | 1 (2) | 2036 (3953) |
| in cells | Priority 15 | 2.6 (5) | Not Available |
| | Priority 31 | 13.2 (16) | Not Available |
| Average Overflow | | 1.5% | 4.2% |
| Average Occupancy | | 3.33 cells/32 depth | 457 cells/8192 depth |

Latency is significantly smaller for the camQ architecture of the present embodiment for both high and low priorities, and the conventional VOQ FIFO architecture actually fails to perform the actual switching service at low priorities. Although lower priorities are handled with greater latency in the present embodiment than are higher priorities, even the relatively low priority of 15 has less latency in the camQ of the present embodiment than the latency of the conventional VOQ FIFO highest priority of 0. Again, the conventional VOQ FIFO fails to even switch priority 15 at all. Further, the lowest priority of 31 (which again, the conventional VOQ FIFO fails to even switch), has a latency in the camQ of the present embodiment that is over two orders of magnitude smaller than the latency of the relatively high priority 3 in the conventional VOQ FIFO (and on the order of the latency with which the conventional art handles its highest priority).

As the priority level drops, the latency and jitter increase can be observed for the camQ architecture, as well. In the present embodiment, this increased latency and jitter for lower priority levels result from the UWRR priority selection process for QoS, described above.

Another significant advantage of the present embodiment is less buffer overflow than is typical in conventional VOQ FIFO. For instance, the camQ architecture of the present embodiment shows no buffer overflow at Bernoulli traffic and 1.5% of buffer overflow at bursty traffic (terms known in the art). The conventional VOQ FIFO, on the other hand, shows about 4.2% of buffer overflow on both Bernoulli and bursty traffic.

The present embodiment also has the advantage of lower average occupancy per port than the conventional VOQ FIFO. The average camQ occupancy per port is also shown. In another embodiment, further reduction of input queue depth is achieved where there is no queue underflow due to SERDES communication latency.

Where an egress SERDES or an egress traffic manager cannot consume all the cells coming into an output buffer, output queue depth has stronger impact on buffer overflow than does the input queue depth. This realistic switch fabric performance is modeled with single chip camQ architecture according to one embodiment, showing the result of buffer overflow and latency assuming the same ingress and egress line speed. The traffic model characterizes performance of the present embodiment that was applied above; 99% loading of bursty traffic with the mean length of 20. The output queue depth is 128. In this model, it is assumed that a small linked list cell buffer in a separate ingress traffic manager chip serves as the "per-destination" flow control. A 128 (8 KB) buffer depth in the traffic manager is also assumed. The performance of the present embodiment under these parameters is summarized in Table 2, below. This performance can also be compared with the conventional VOQ FIFO (summarized above in the corresponding column of Table 1).

TABLE 2

CAMQ LATENCY AND BUFFER OVERFLOW WITH FLOW CONTROL WITH OUTPUT QUEUE ENABLED

| Latency in cells | Priority 0 | 1.98 |
|---|---|---|
| | Priority 3 | 20.5 |
| | Priority 15 | 95 |
| | Priority 31 | 628 |
| Buffer Overflow | | 2.62% |
| Input Buffer Occupancy | | 4.5/32 depth |
| Output Buffer Occupancy | | 73/128 depth |

Table 2 shows that the camQ architecture of the present embodiment provides performance superior to conventional VOQ FIFO in terms of buffer overflow and latency. The average output buffer occupancy is higher than input buffer occupancy. Thus, the camQ architecture of the present embodiment emulates an ideal characteristic of output queue switching.

Figure 3:
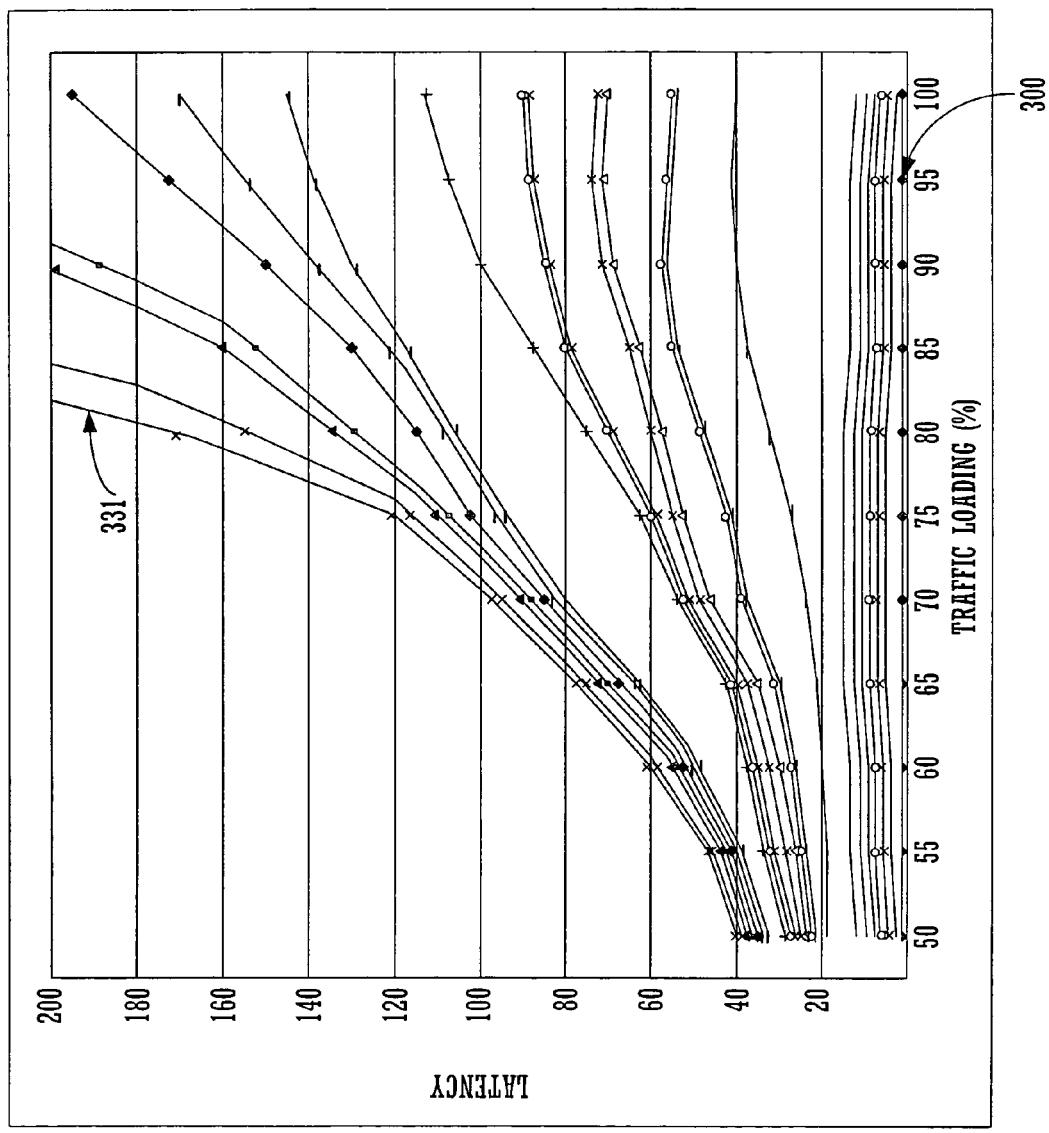
FIG. 3 depicts a CAM cell structure for connection request and age tag comparison, in accordance with one embodiment of the present invention.

With reference to FIG. 3, the overall latency of each of the 32 priorities of the present embodiment is plotted as a function of traffic loading. The QoS characteristic of the present embodiment with different traffic loading in bursty traffic is shown. The bottom plot 300 is for priority 0 and the top plot 331 is for priority 31. Plots between plot 300 and plot 331 are not labeled, so as to keep the figure uncluttered (they could however accordingly be numbered 301 through 330, respectively). This well-distributed latency pattern shows that the camQ architecture of the present embodiment emulates ideal QoS.

Priority and Destination CAM and Connection Grant Generator

Figure 4A:
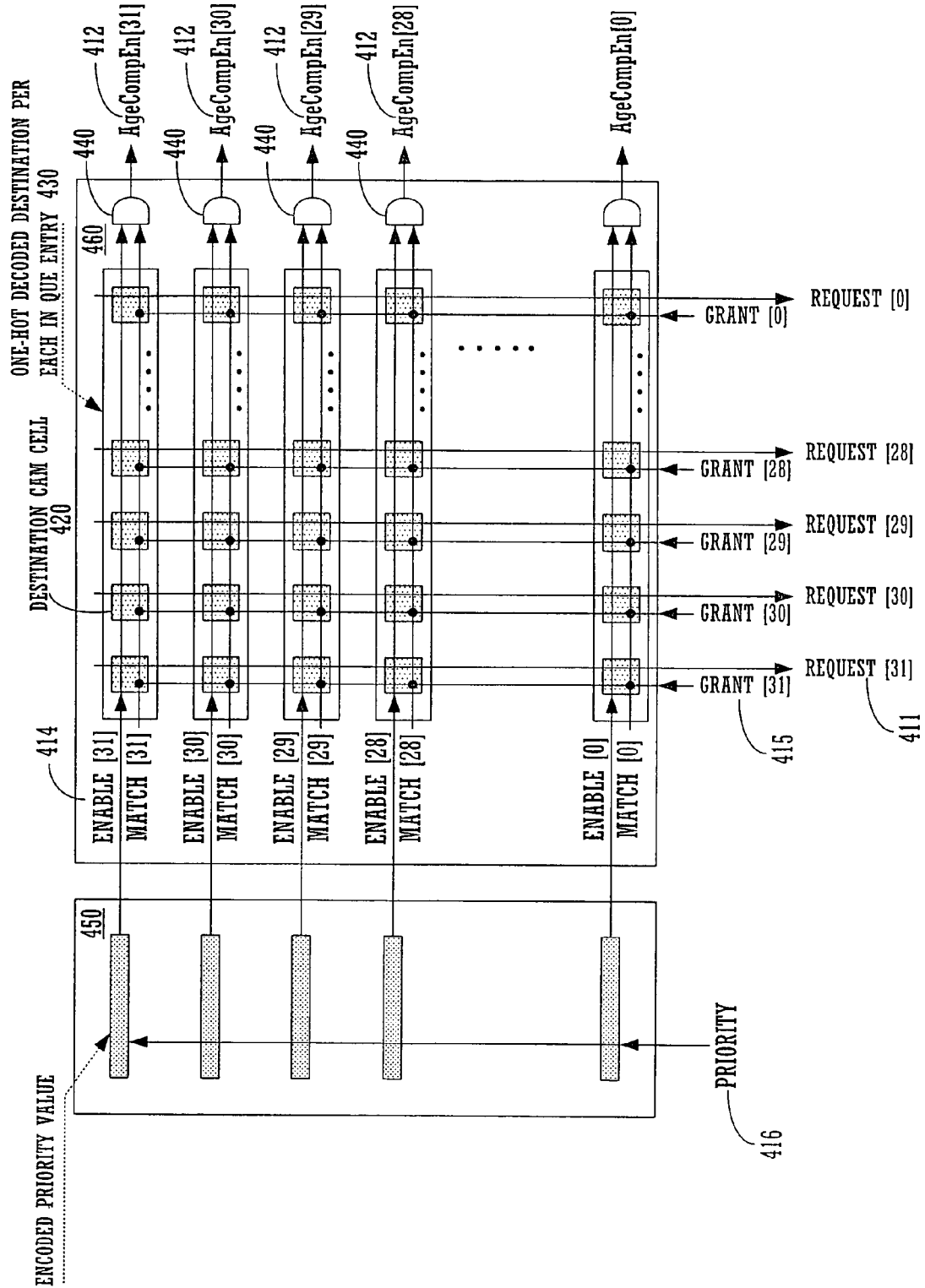
FIG. 4A depicts an exemplary CAM structure, in accordance with one embodiment of the present invention.

FIG. 4A depicts a new CAM structure 400 for generating a request Request [i] 412 and age comparison enable signals AgeCompEn [i] 413 by the inputs of Enable [i] 414 and grant [i] 415 where 0≦i≦31.

When a priority for the connection request is decide, the priority value 416 is provided to block 450. Block 450 is made by regular CAM structure providing signals Enable [i] 414. If there are multiple cells with the provided priority value, multiples of signals Enable [i] can be activated.

Block 460 has one-hot coded destination values at each of the bits of destination CAM cell 420 at each entry 430. For example, if entry j has a destination to out port k, only the kth bt of destination CAM cell 420 at entry j 430 has a value of '1'; the other bits have a value of '0' where 0≦(j, k)≦31.

Figure 5A:
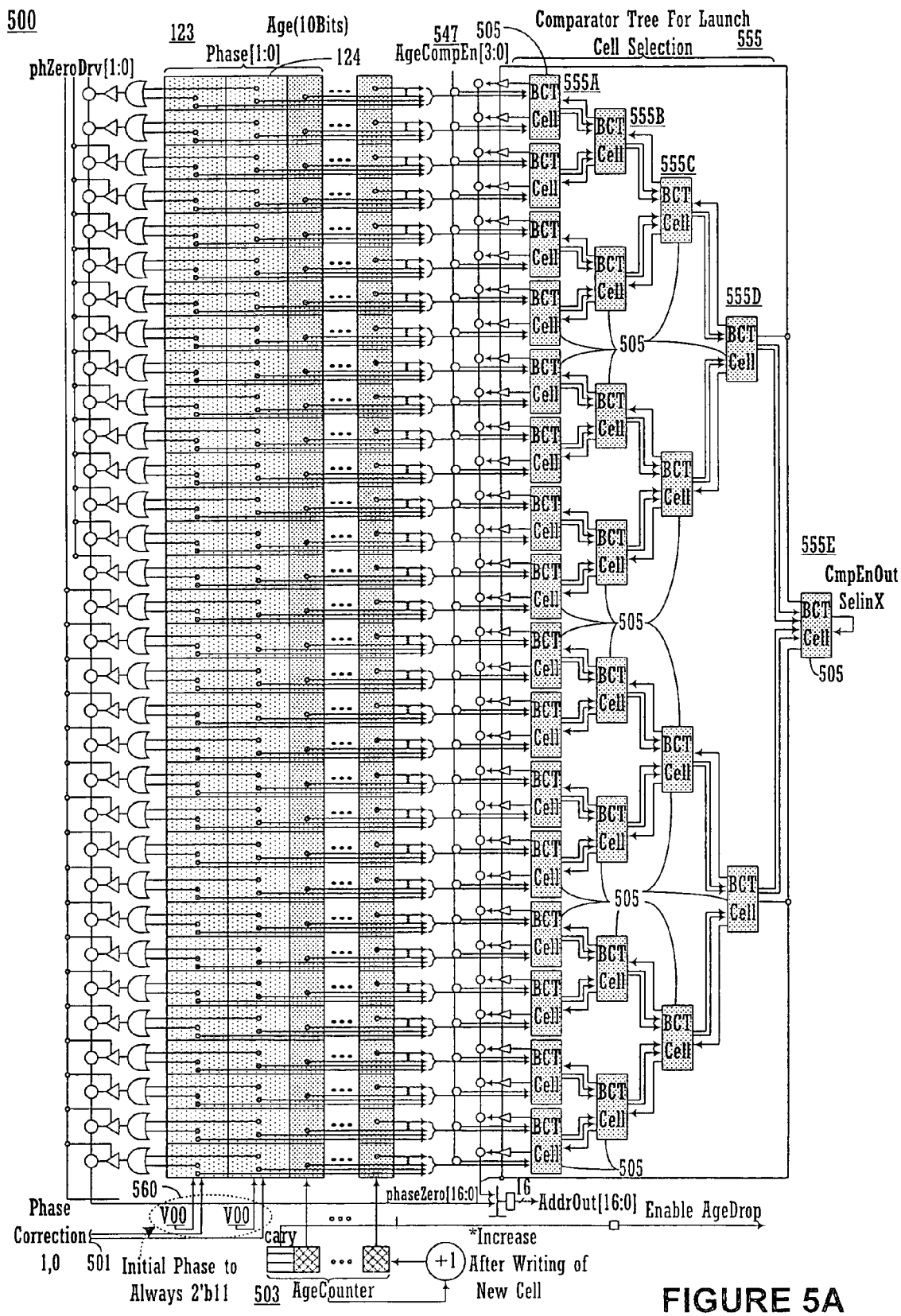
FIG. 5A depicts an ingress side age comparator, according to an embodiment of the present invention.

Assuming entry l, m, and n have enabled and the cell in entry 1 has a destination of p and cell in m and n have destination q, each signal Enable [1], Enable [m] and Enable [n] signal generate Request [p] and Request [q] by the structure of the destination CAM cell. The activated request lines go to corresponding grant generators, and in one embodiment, only one grant signal will be activated. Assuming for instance that Grant [q] was activated, in the present embodiment either cell m or cell n can depart to destination q; not both at the same time. Thus, corresponding age comparison enable signals AgeCompEn [m] and AgeCompEn are activated, e.g., by AND gate 440. An age comparator (e.g., age comparator 500; FIG. 5A) selects which entry m or n can depart. Here, 0≦(1, m, n, p, q)≦31.

Figure 4B:
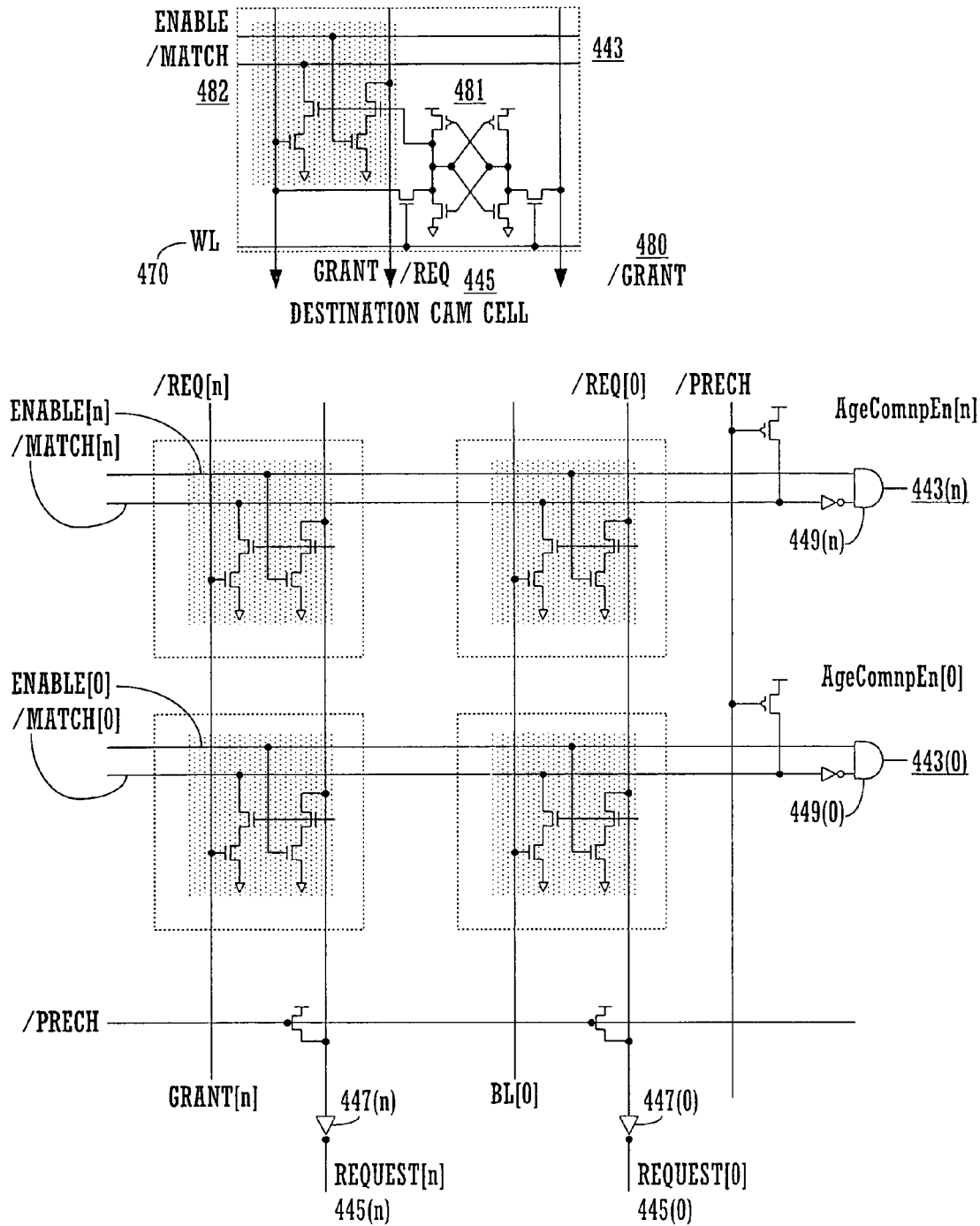
FIG. 4B depicts an exemplary CAM block, in accordance with one embodiment of the present invention.

Destination CAM block 460 is depicted in somewhat greater detail in FIG. 4B. One-hot coded cell destinations are written by WL 470. During cell writing, the one-hot destination values are provided by signals 480 Grant and /Grant. Signal /Match 482 can be activated if transistor array 481 contains a value of '1' and signals Grant and /Grant are '1' and '0' with respect to each other. Age comparison enable signal AgeCompEn [n] 443 goes active if signals /Match [n] and Enable [n] are '0' and '1' with respect to each other by AND gate [n] 449.

With reference to FIG. 5A, an ingress side age comparator 500 is depicted in accordance with an embodiment of the present invention. In one embodiment, ingress age comparator 500 operates by an data cell age comparison process 5000. Process 5000 is described with reference to FIG. 5B. Ingress side age comparator 500 and data cell age comparison process 5000 are discussed together for purposes of clarity and brevity.

Process 5000 begins with step 5100, wherein a new data cell arrives in queue entry i. Age comparator 500 receives new incoming cells.

In step 5200, an age is written for the newly arrived data cell to the entry i of age comparator 500. New incoming data cells have the age value currently set by age counter 503. In one embodiment, the phase value of a new cell is 2'b11.

In step 5300, age counter 503 increases its age count to prepare a bigger age value for the next arriving cell. Age counter 503 supplies age value to each cell arriving in the ingress queue (e.g., ingress CAM) 123, which in one embodiment comprises 10 bits.

For programming packet switching by the crossbar switch, the data cells are scheduled for launching, in one embodiment, by an interleaved age and priority scheme (e.g., interleaved age-priority selection process 1200; FIG. 12). In one embodiment, the age comparison and selection component of this interleaved age/priority scheme considers the age of the various queued packets. Thus in step 5400, the ages of enabled signals (AgeCompEn) 547 are compared and the oldest cell in queue is correspondingly selected.

When age counter 503 overflows, subsequent age values are aliased. In step 5500, it is determined whether an overflow condition exists in counter 503. If not, process 5000 loops back to step 5100 and continues accordingly.

Upon sensing the overflow, the phase correction signals 501 are activated, decreasing the phase of the cells already existing in ingress queue 123. This phase correction is performed automatically at each of the entries 124. Thus, the age value of each entry at age comparator 500 is read as the following.

{(2-bit phase value), (10-bit age value)}

The phase value of new arriving cells, in one embodiment, is 2'b11 by point 560.

By this age comparison and selection component of the interleaved age/priority scheme, the smaller the age of a cell, the older that cell is, and thus the sooner that particular cell should be serviced for switching. Further, by this scheme, a cell that becomes too old is advantageously eliminated; its data considered stale. Thus, if it is determined in step 5500 that a counter overflow condition does exist in age counter 503, then process 5000 proceeds to step 5600, wherein the stale aged data cell is dropped.

Then in step 5700, phase correction is effectuated for the data cells extant in queue, whereupon process 5000 loops back to step 5100 and proceeds accordingly. In one embodiment, phase correction modifies the data cells in queue 124 by the following scheme:

0. new cell phase written upon arrival as 2'b11
1. phase [1]<=(phase correction & ~phase [0]) ? 1'b0: phase [1];
2. phase [0]<=phase correction ? 1'b_[0]: phase [0];
3. invalidate.

This effectuates a three-step phase correction. The new cell phase is written as 11. Upon initial phase correction, that cell's phase is re-written as 10. Subsequent phase correction re-writes that cell's phase as 00. At this point, if the need arrives for further phase correction, that cell's data is considered stale and the cell is dropped (e.g., invalidated; eliminated), such that another, fresher cell can be selected. For instance, if a valid cell has achieved a phase of 2'b00 (e.g., by phase corrective re-writing), and yet another phase correction is directed, that cell will be invalidated as being too old. In one embodiment, the dropping of the cell is effectuated by driving a phase zero vector 'iPDCam'.

The phase correction order of one embodiment can thus be summarized as:

11→10→00→Invalidate.

In the present embodiment, there is no phase correction step wherein the cell is re-written '01'. By eliminating any such '01' phase re-writing, toggling of the least significant bit (LSB) is prevented. Instead of toggling, the LSB simply goes clear. Advantageously, this effectively reduces the counting circuitry demands imposed by the phase correction process, such that resources are conserved for redirection to other tasking or for elimination.

In one embodiment, this three-step phase correction is effectuated by a phase cell structure 600, as depicted in FIG. 6. Phase [1] sub-cell 610 comprises transistors 611 and 612, inverters 613, and transistors 614 and 615. The drain of transistor 611 is at Vdd. Transistor 611 has an inverted 'phase [0]' gate input, and its source is connected in series with the drain of transistor 612. Transistor 612 has a 'phase correction' gate input. The source of transistor 612 is connected in series with a mirrored pair of inverters 613. Inverters 613 then connect in series with the drain of transistor 614. Transistor 614 has a 'phase correction' gate input. The source of transistor 614 is connected in series with the drain of transistor 615. Transistor 615 has a '~phase [0]' gate input, and its source is grounded.

Phase [0] sub-cell 620 comprises transistors 621 and 622, inverters 623, and transistors 624 and 625. The drain of transistor 621 is at Vdd. Transistor 621 has an inverted gate input from the source of transistor 622. The source of transistor 621 is connected in series with the drain of transistor 622. Transistor 622 has a 'phase correction' gate input. The source of transistor 612 gates transistor 621 and is also connected in series with a mirrored pair of inverters 623. Inverters 623 then connect in series with the drain of transistor 624, which also gates transistor 625. Transistor 624 has a 'phase correction' gate input. The source of transistor 624 is connected in series with the drain of transistor 625. Transistor 625 is gated by the drain of transistor 624. The source of transistor 625 is grounded.

Referring again to FIG. 5A, the age comparison and selection component of the interleaved age/priority scheme for data cell launch selection is effectuated, in one embodiment, by a comparator tree 555. In one embodiment, comparator tree 555 comprises five progressive layers 555A through 555E of binary comparator tree (BCT) cells 505. In the present embodiment, each stage of the age stack (e.g., ingress queue) 123 presents one input to the BCT cells 505 comprising the first layer 555A, via age comparison enable stage 547. This effectuates a first stage of ingress side age comparison.

The output of each pair of BCTs 505 comprising layer 555A are compared by a BCT 505 in layer 555B, thus effectuating a second stage of age comparison. The output of each pair of BCTs 505 comprising layer 555B are then compared by a BCT comprising layer 555C, thus effectuating a third stage of age comparison. The output of each pair of BCTs 505 comprising layer 555C are then compared by a BCT comprising layer 555D, thus effectuating a fourth stage of age comparison. Finally, in the present embodiment, the output of each pair of BCTs 505 comprising layer 555D are then compared by a single BCT comprising layer 555D, thus effectuating a fifth stage of ingress side age comparison.

Figure 7:
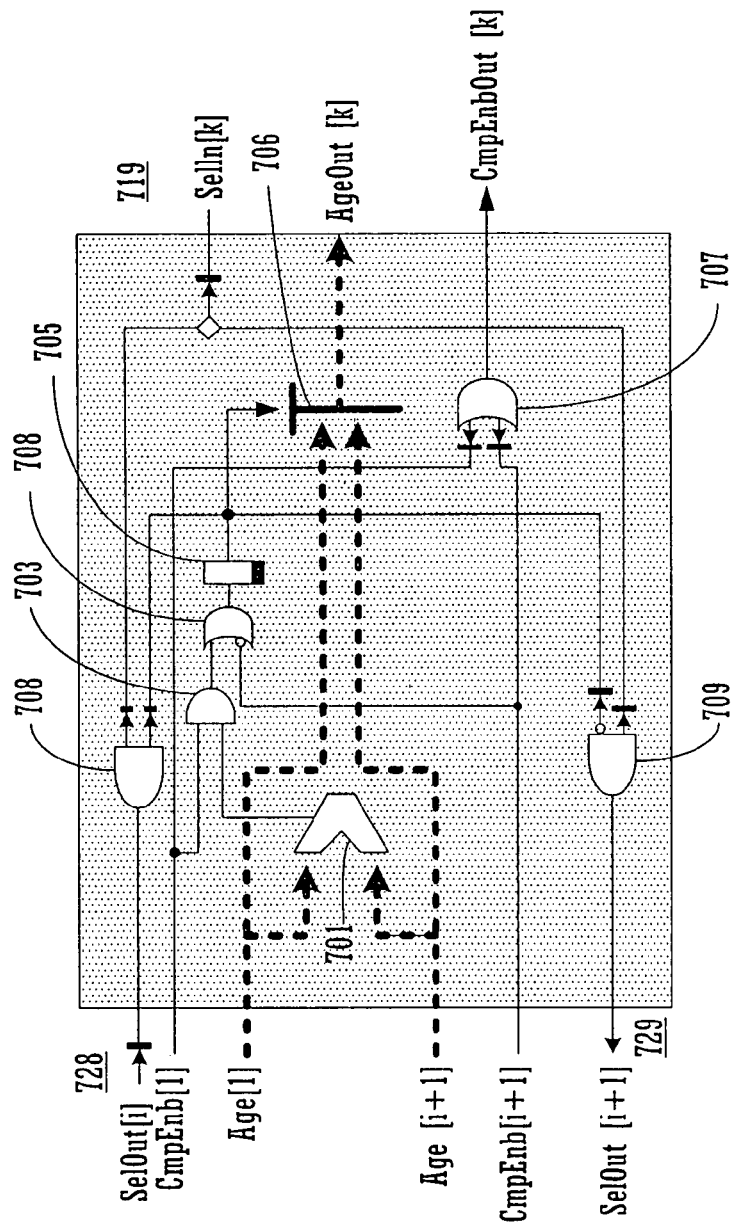
FIG. 7 depicts an ingress side binary comparator tree cell structure, according to an embodiment of the present invention.

The structure of a single BCT 505 cell of one embodiment is depicted in FIG. 7. A comparator 701 subtractively compares age inputs 'j' and 'j+1' to provide the older age to an upper level of age queue 123 (FIG. 5A) via age multiplexer (MUX) 706. Effectively simultaneously, the age comparison result is stored via AND gate 703 and OR gate 704 into an age comparison result latch 705. Upon the return of a select age input signal 719 'SelIn[k]' from the upper level of input queue 123, either the output selection 728 'SelOut [j]' or the output selection 'SelOut [j+1]' is activated, based on the result of the comparison previously latched in latch 705. In the event that the select age input signal 719 'SelIn[k]' returns not activated, then both of the output selection 728 'SelOut [j]' and the output selection 729 'SelOut [j+1]' to the lower level of input queue 123 remain in an unactivated condition.

Exemplary Interleaved Age-Priority Based Selection

Data cells have different importances, relative to one another. These differences in relative importance characterize a priority by which each data cell should be handled for switching, relative to other data cells. Data cells having higher priority than other cells should be selected for switching earlier than data cells having lower priorities. However, the age of a particular data cell is considered relevant in scheduling switching by an embodiment of the present invention.

The older that a particular data cell is, the sooner that particular data cell should be serviced for switching. A penalty of not switching a particular data cell expeditiously is that its data can become stale. Thus, the embodiments described above effectuate an interleaved age-priority based selection criteria for both packet switching by the crossbar switch, as well as export from the output ports thereof.

In one embodiment, data cells having higher priorities are serviced earlier than data cells having lower priorities by the WRR scheme described above. However, to prevent lower priority cells from being effectively "stuck in queue," e.g., never being switched, the present embodiment takes the age of the data cells into account for scheduling switching as well. In one embodiment, where two cells of equal priority are to be serviced for switching, the older data cell is serviced before the younger data cell. In the present embodiment, the age of a data cell can advantageously serve as a tie-breaker in scheduling its switching, vis-á-vis other data cells of equal priority.

Figure 8:
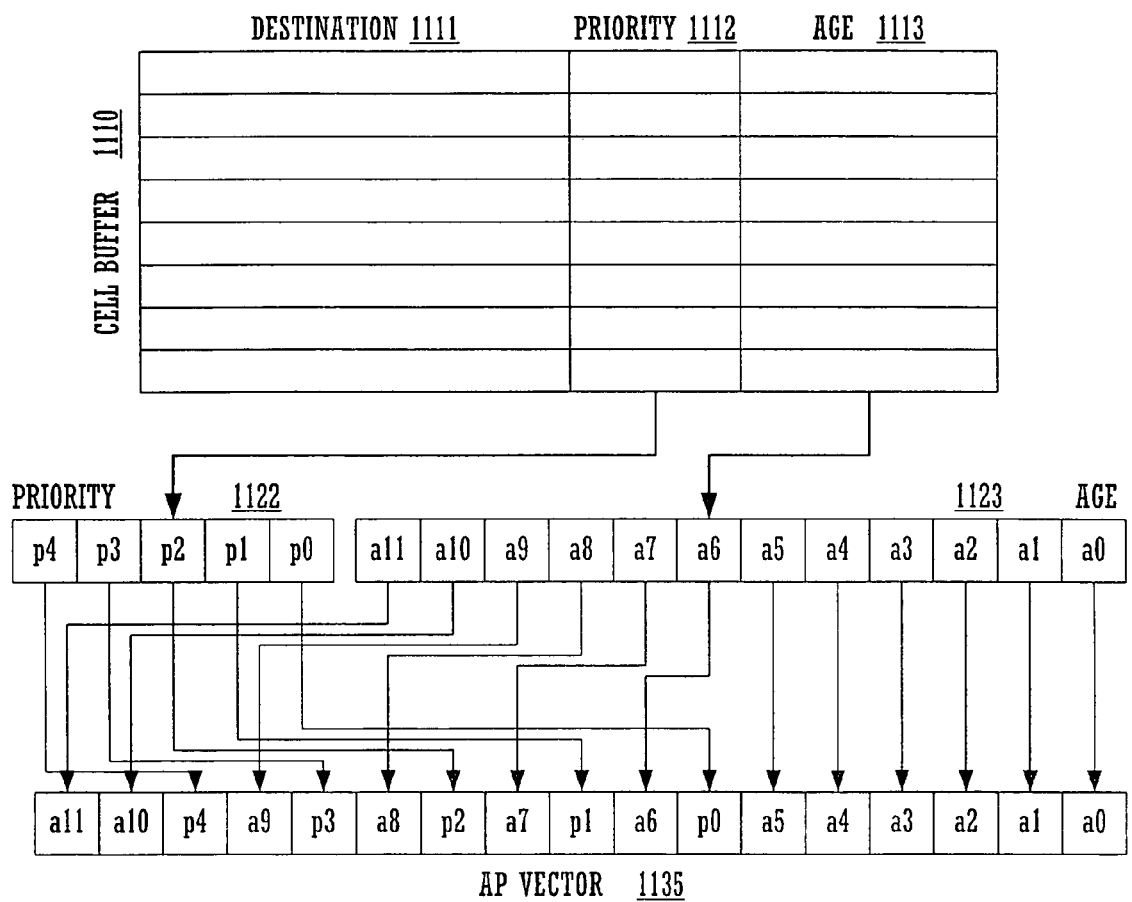
FIG. 8 an interleaved age-priority based selection scheme, according to an embodiment of the present invention.
Figure 9:
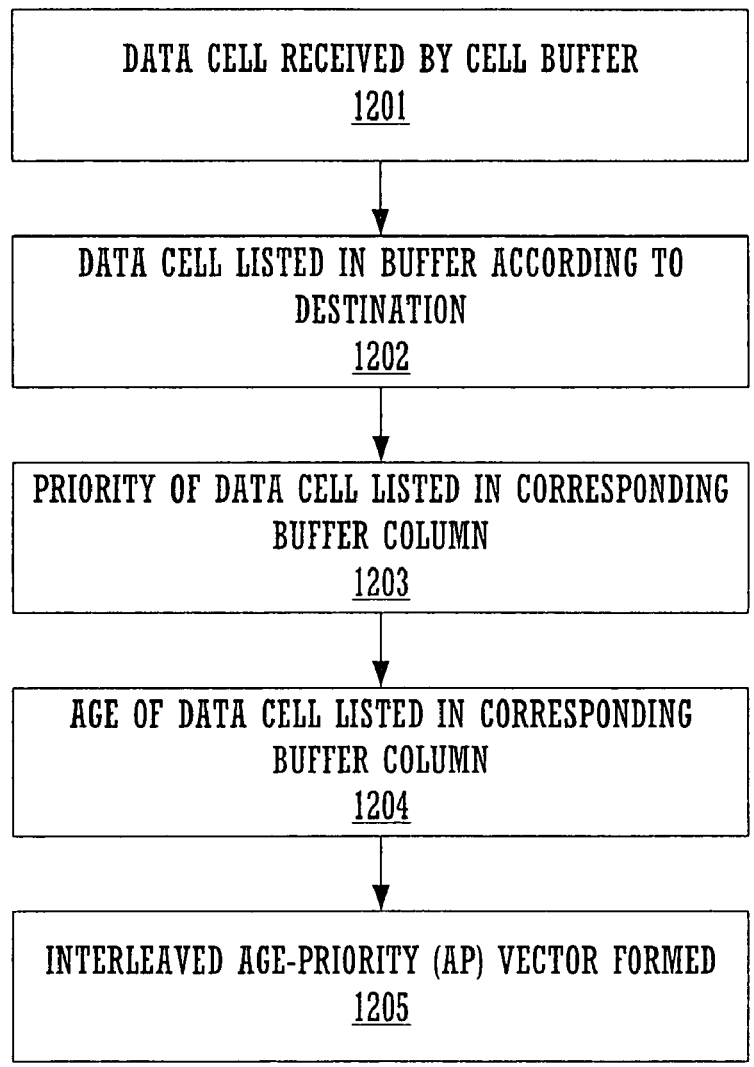
FIG. 9 is a flowchart of the steps in a method for interleaving data cell age and priority to schedule switching, in accordance with one embodiment of the present invention.

In one embodiment, an interleaved age-priority based selection process proceeds by an algorithm that takes into account the need to service the aging data cells (of all priorities), as well as high-priority cells. With reference to FIG. 8, an age-priority interleaving selection 1100 is described according to one embodiment of the present invention. With reference to FIG. 9, a process 1200 for interleaving data cell age and data cell priority for switching according to one embodiment is described. It is appreciated that, in another embodiment, steps of process 1200 can be performed in another order. Selection 1100 and the interleaved age-priority selection process 1200 are discussed together for purposes of clarity and brevity.

Referring to FIG. 8, a data cell buffer 1110 is comprised of three columns including a destination column 1111, a priority column 1112, and an age column 1113. Referring to FIG. 9, in step 1201, a data cell is received by buffer 1110. In step 1202, a particular data cell is listed in a single row of cell buffer 1110 by its destination, under destination column 1111. In step 1203, the priority of that particular data cell is then listed in the priority column 1112 space corresponding to that row. In step 1204, the age of that particular cell, which can be changed dynamically as the cell ages, is listed in age column 1113 space corresponding to that row. As data cell buffer 1110 fills with data cells, vectors can be formed corresponding to the priority and age of the data cells therein.

In step 1205, priority vectors 1122 are formed from all of the entries within priority column 1112 of cell buffer 1110. Here, 'priority' comprises a five bit binary coded element (e.g., 32 priority levels).

In step 1206, age vectors 1123 is formed from all of the entries within age column 1113 of cell buffer 1110. Here, 'age' comprises a 12 bit binary coded element (e.g., 4,096 age levels)

Then in step 1207, priority vector 1122 and age vector 1123 together form an age-priority (AP) vector 1135. In one embodiment, any bit order combination can comprise AP vector 1135, depending upon the service requested. Further, in one embodiment, the bit order comprising AP vector 1135 can be changed to provide for different types of services. The exemplary AP vector 1135 depicted lists data cells in order for servicing based on the desire to service aging cells, as well as to service high priority cells. At every cycle, these AP vectors 1135 from all cells in cell buffer 1110 are compared to each other to find (e.g., to identify) the largest one. The largest of the AP vectors 1135, in the present embodiment, means "aged enough" and also "higher priority," relative to the other cells in cell buffer 1110. The cells with the largest AP vector 1135 will be serviced at that cycle, and thus removed. By this arrangement, cells with an age value greater than 1,024 (e.g., $2^{10}$=12'b0100_0000_0000) can be selected, even if there are higher priority cells in the queue.

According to different bit orders between priority and age, different characteristics of service will be shown. As an example, the following bit order focuses more on aged cells than the exemplary AP vector 1135 depicted in FIG. 8.

a11-a10-a9-p4-a7-p3-a6-p2-a5-p1-a4-p0-a3-a2-a1-a0

And the following exemplary bit order will serve higher priority cells better than aged cells.

p4-a11-p3-a10-p2-a9-p1-a8-p0-a7-a6-a5-a4-a3-a2-a1-a0

It is appreciated that various other bit orders can service either higher priority cells or more aged cells more effectively. The bits a0-a11 present the age of the queued cells. The bit a0 comprises the LSB of age; bits a1-a10 present increasing age significance, respectively, and the bit a11 comprises the most significant bit (MSB) of age. Similarly, the bits p0-p4 present the priority of the queued cells. The bit p0 comprises the LSB or priority; the bit p4 comprises the MSB of priority and bits p2-p3 present increasing priority significance, respectively.

Advantageously, in the present embodiment, the bit order can be changed dynamically. This dynamic ability to reconfigure the bit order of the AP vector 1135 can effectuate the UWRR selection discussed above, interleved with age selection to reduce dropping data cells because of excessive age and stale data. This helps to economize on operating resources and make switching operations more efficient.

AP vectors 1135 are formed for every cell in queue (e.g., within cell buffer 1110) as soon as the cell arrives in queue. At each cycle, each of the AP vectors 1135 are compared to determine the maximum. The queued cell having the maximum AP vector 1135 (e.g., from the standpoint of service type) is selected for servicing. In step 1208, the AP vectors 1135 of all queued cells are compared. In step 1209, a queued cell is selected for switching based on the AP vector 1135 configured. Process 1200 is complete at this point.

A Method for Multicast Service in a Crossbar Switch

Exemplary Multicast Control

Data cells which are to be multicast (e.g., multicast cells) can be serviced for transfer through the crossbar switch with heightened priority. Multicasting can conserve bandwidth because the same data is sent to multiple destinations. Advantageously therefore, multicast based priority (MBP) effectuates a greater degree of switching efficiency. In one embodiment, multicast cells are serviced with the highest priority, as compared with unicast cells. A particular multicast cell can be serviced with priority over another multicast cell by comparing their relative assigned priority values and selecting the cell with the higher assigned priority value for priority of service with respect to the cell with the lower assigned priority value.

Figure 10:
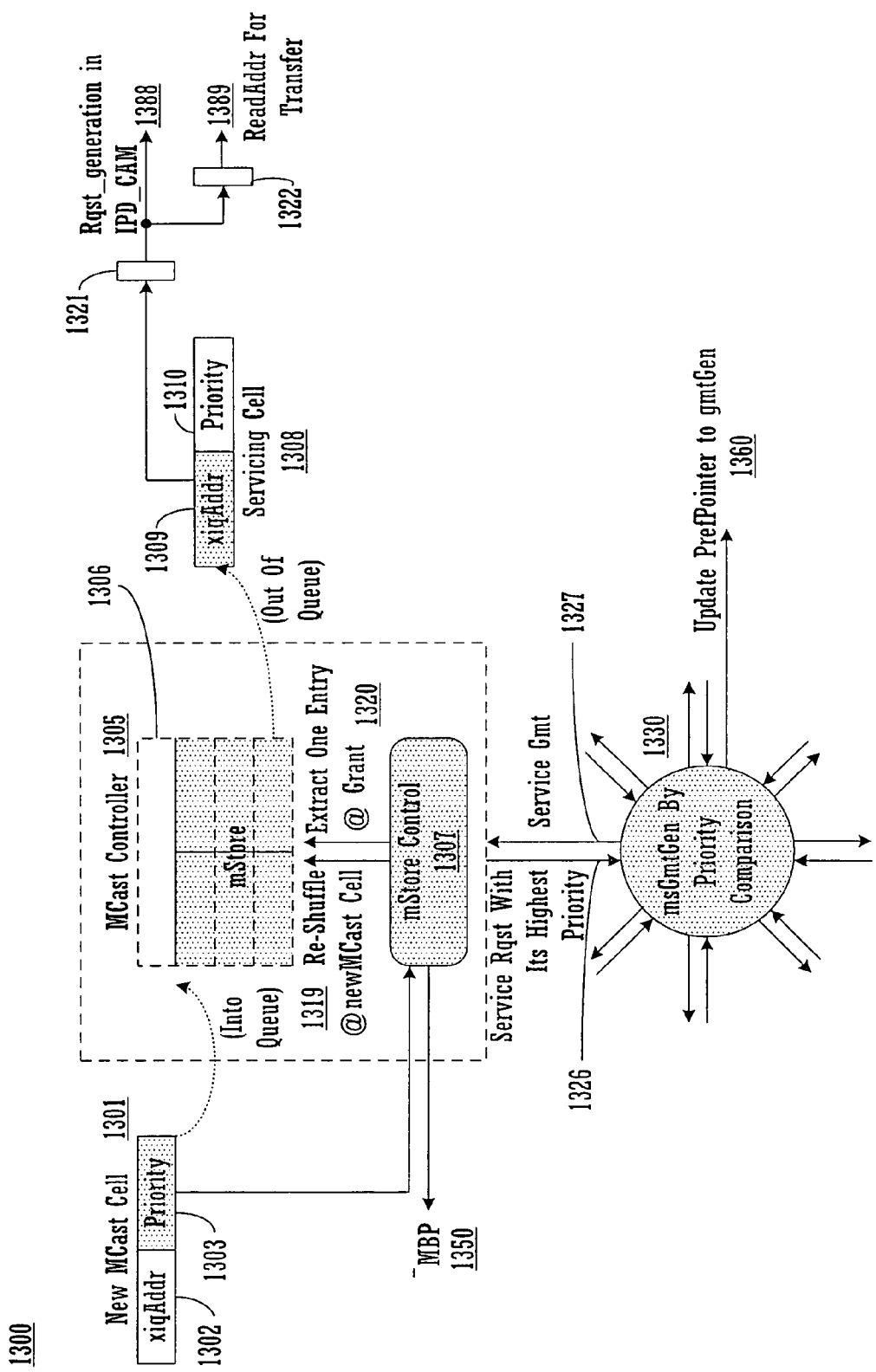
FIG. 10 depicts multicast flow control, according to an embodiment of the present invention.

With reference to FIG. 10, an exemplary multicast control system 1300 supports the multicasting process, according to an embodiment of the present invention. Multicast control system 1300 comprises a multicast controller 1305 and a multicast service grant generator 1330. Multicast controller 1305 comprises a multicast storage (e.g., 'mStore') queue 1306 and a storage controller (e.g., 'mStore Control') 1307. Upon receipt of a new multicast cell 1301, system 1300 determines whether a unicast iteration for transferring and launching cells is in progress and prevents any generation of a request signal for transfer by or on behalf of the new cell 1301 until the unicast iteration is complete. The new multicast cell 1301 is written into an ingress priority CAM address ('iPrioCAM').

Upon receipt, address and priority information corresponding to exemplary new multicast data cell 1301 is received by multicast control system 1300. In one embodiment, mStore 1306 comprises a number of input port register sets. The crossbar input queue (XIQ) iPrioCAM address (e.g., 'xiqAddr') 'i' and the priority 'p' of exemplary multicast cell 1301 is recorded in mStore 1306 at input port 'n'. Each input port has the same structure (e.g., cells are recorded at each input port by its xiqAddr and priority); in one embodiment, mStore 1306 has 32 ports, 0-31. The payload of the new cell 1301 is stored at the corresponding address (e.g., xiqAddr 'i', port 'n') in the XIQ SRAM (e.g., iSRAM 103; FIG. 1). To prevent an excessive population of multicast cells in XIQ SRAM, in one embodiment mStore 1306 limits the number of elements asserting multicast back pressure (MBP).

Within mStore 1306, cells such as cell 1301 are queued for servicing based on priority. Upon entry of the new cell 1301 in mStore 1306, the service order of the cells therein can be re-shuffled, based on priority. Re-shuffling the order of cells stored in mStore 1306 is initiated by a 're-shuffle new MCAST cell' signal 1319 generated by mStore flow controller 1307. Flow controller 1307 controls the movement of cells through (e.g., transfer of the cells out of) mStore 1306 based on this priority and using an mStore FIFO empty (e.g., ME) bit. Advantageously, this function helps to control multicast backpressure due to build-up of non-transferred multicast cells. When a valid entry is present in port 'n' of mStore 1306, flow controller 1307 asserts a multicast service request 'msRqst[n]' signal 1326 and MBP signal 1350.

Upon assertion of 'msRqst[n]' signal 1326, central multicast grant generator 1330 gives a multicast service grant 'msGrnt[n]' signal 1327 by request priority comparison. In one embodiment, the functionality of central multicast grant generator 1330 can be provided by a base grant generator (e.g., connection grant generator 129; FIG. 1, 4A). In one embodiment, central multicast grant generator can be implemented by BCT tree structure 555 (FIG. 5A) for requesting the priority comparison.

Figure 11A:
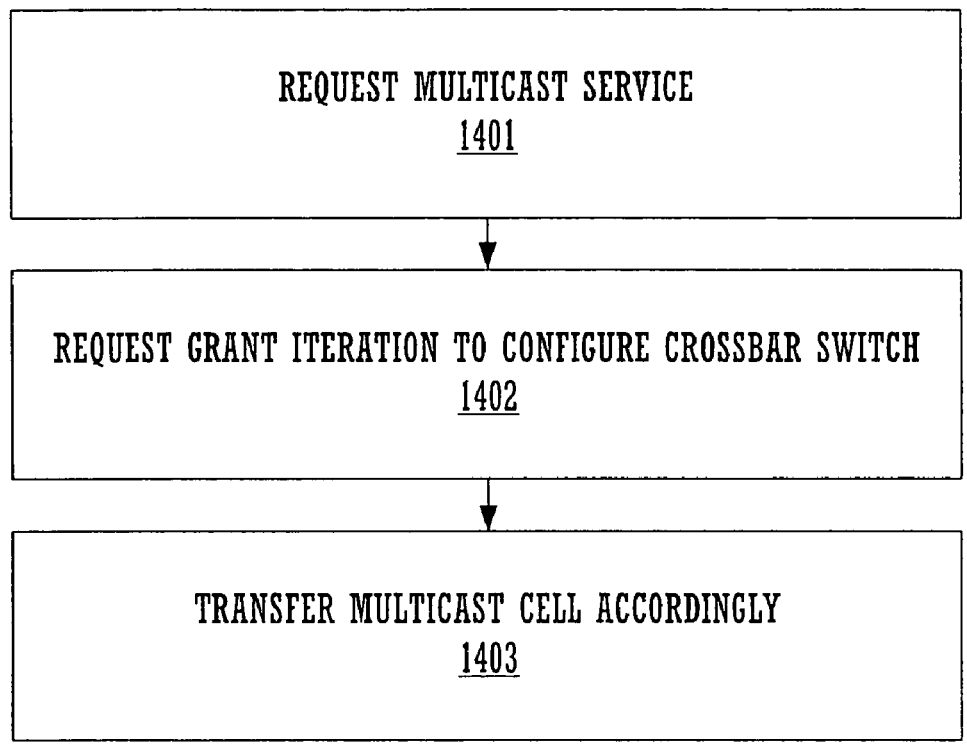
FIG. 11A is a flow chart of a multicasting process, according to an embodiment of the present invention.

When port 'n' is given a multicast service grant (e.g., granted multicast service), of grant generator 1330 can change the preference pointer value to 'n+1'. Changing the preference pointer value takes place at the next clock s-cycle ('sClk') (e.g., s-cycle 202; FIG. 2). With reference to FIG. 11A, a multicast process 1400 begins with step 1401 wherein multicast service is requested, as discussed above. In step 1402, the granted multicast cell is running a request grant iteration process for the crossbar switch to be configured to effectuate corresponding transfer of the multicast cells. Process 1400 is complete upon execution of step 1403, wherein the multicast cell is transferred accordingly.

Figure 11B:
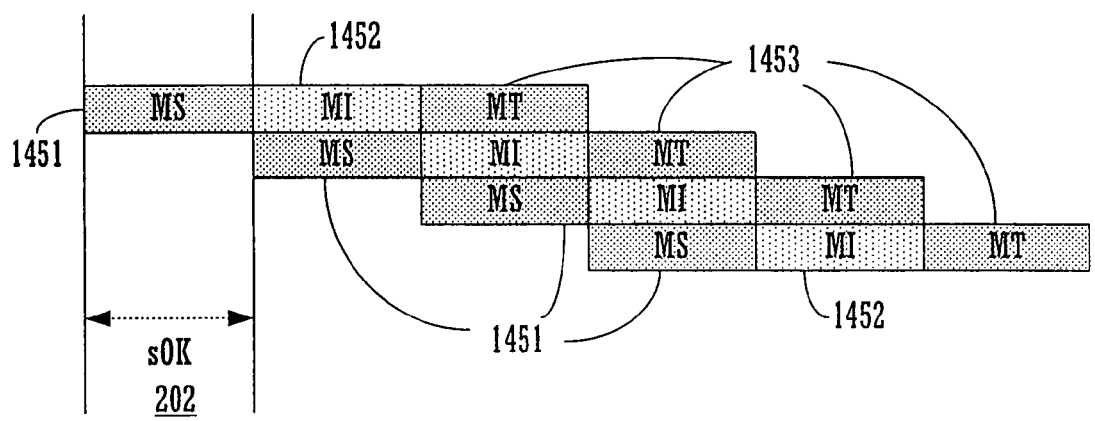
FIG. 11B depicts multicast pipelining, according to an embodiment of the present invention.

FIG. 11B depicts a corresponding multicast pipelining scheme 1450. A multicast service request ('MS')(e.g., step 1401; FIG. 11A) 1451 occurs during sClk 202. Iteration ('MI')(e.g., step 1402; FIG. 14A) 1452 follows. While MI 1452 is taking place, another MS 1451 can transpire. Transfer ('MT') (e.g., step 1403; FIG. 14A) occurs upon completion of MI. While transfer takes place, MI corresponding to the other MS can transpire, as well as yet another MS. Pipelining scheme 1450 is reiterative. Advantageously, such multicast pipelining makes efficient use of multicasting, switching, and related resources.

With reference again to FIG. 10, upon generating msGrnt[n] signal 1327, mStore controller 1307 generates an 'extract' signal 1320, whereupon one entry, e.g., multicast cell 1308, is extracted from mStore 1306 for servicing. Multicast cell 1308 has xiqAddr 1309 and priority 1310.

To make a request for actual transfer of the multicast cell 1301 to each egress port (ePort), register 1322 in iPrioCAM is provided with the address 'i' of the cell. With the preference pointer set to the corresponding in Port at the first iteration, each ePort can give a grant signal to the port with a service-granted multicast cell (e.g., port 'n'). In the event that a servicing multicast cell is not immediately departing, another port can launch a waiting unicast cell to its destination. Advantageously, this ability to service waiting unicast cells while awaiting departure of servicing multicast cells improves switching efficiency. Upon granting egress to a servicing multicast cell, the crossbar switch is configured to transfer cells accordingly at the next sClk. The address 'i' of the multicast cell is provided by register 1322 (e.g., 'ReadAddr' signal 1389) to read out and transfer the corresponding payload from the XIQ SRAM.

Exemplary Multicasting Processes

Multicast Service Request Stage

With reference to FIG. 12, an exemplary process 1500 effectuates a multicast service request (e.g., step 1401; FIG. 14A), according to one embodiment of the present invention. Process 1500 can be implemented using a multicast control system (e.g., multicast control system 1300; FIG. 10) and other components of a CamQ architecture (e.g., of system 100; FIG. 1). Process 1500 begins with step 1501, wherein the payload of a newly arriving multicast (MCast) cell is placed in XIQ SRAM port 'n', address 'i'.

In step 1502, a one-hot coded MCast fan-out (e.g., destination list) is written into iPrioCam address 'i' with its valid bit cleared. In step 1503, address 'i' and the priority 'p' of the MCast cell is recorded in an mStore register set at port 'n' (e.g., mStore 1305; FIG. 10). In step 1504, the service order within the mStore is re-shuffled as necessary, based on the assigned priority of the new entry corresponding to the newly arriving MCast cell.

Figure 13:
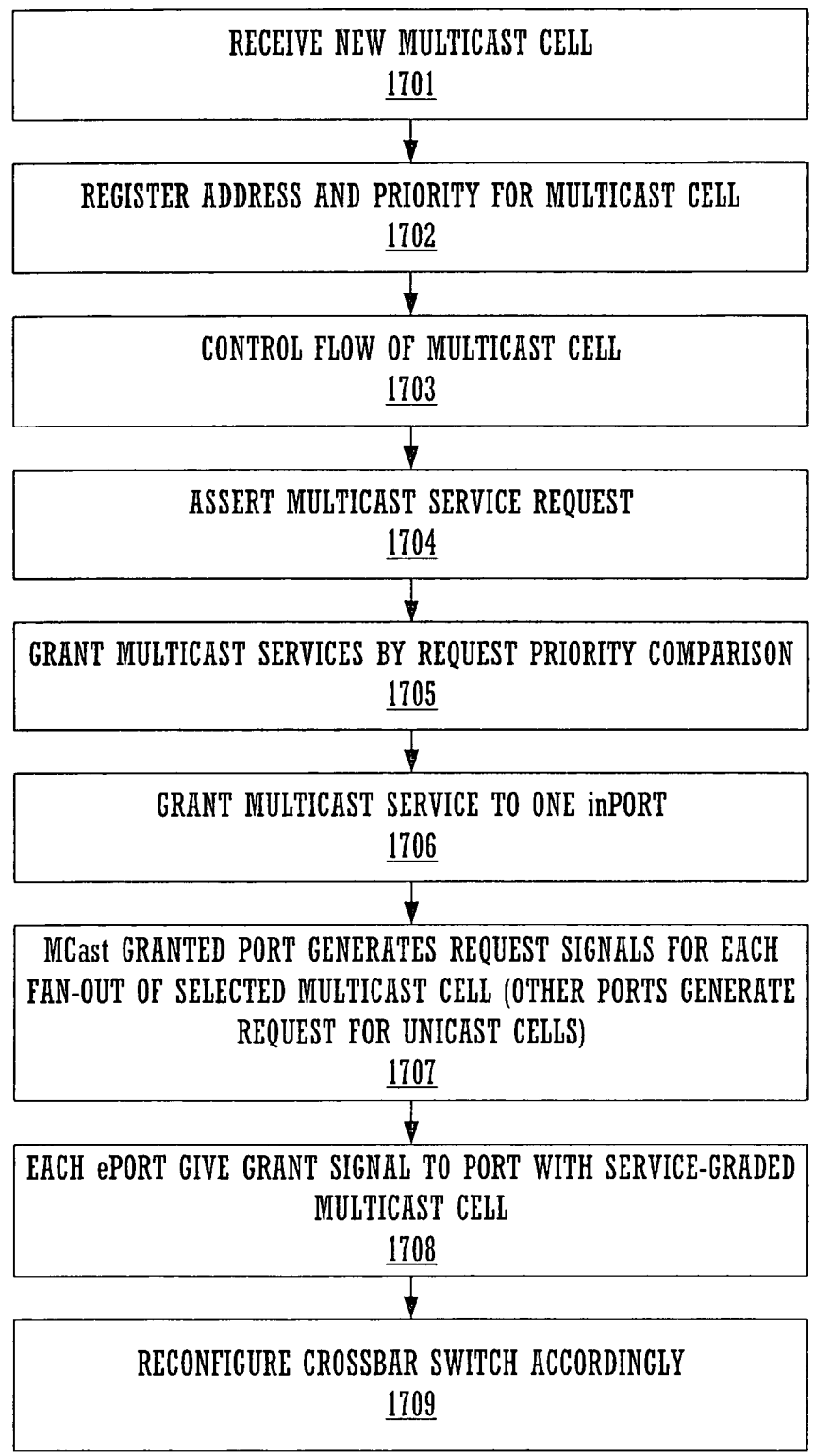
FIG. 13 is a flow chart of multicast iteration for a service granted multicast data cell and multicast data cell transfer process, according to an embodiment of the present invention.

In step 1505, MCast flow is controlled. In one embodiment, an ME bit (e.g., 'mStore FIFO Empty') provides information to a MCast controller (e.g., MCast controller 1307; FIG. 13) for MCast flow control. In step 1506, it is determined whether a valid entry is in mStore port 'n'. If it is determined that a valid entry is in port 'n', then in step 1507, a multicast service request is asserted for port n (e.g., 'msRqst [n]'). If it is determined that no valid entry is in port 'n', then process 1500 loops back to step 1505.

In step 1508, a central multicast grant generator (e.g., central multicast grant generator 1330; FIG. 13) gives a multicast service grant (e.g., 'msGrant [n]'), by comparison of requesting priority. In step 1509, it is determined whether port 'n' has been granted multicast service. If not, process 1500 loops back to step 1508. If it is determined that port 'n' has been granted multicast service, then in step 1510, the grant generator changes its preference pointer at a next 'sClk' to give the grant to the multicast service-granted inport.

In one embodiment, all of the grant generator quadratures (e.g., 'GrntGen_Q1/Q2/Q3/Q4') change the preference pointer value to 'n' to grant multicast service to the service-granted inport. Process 1500 is complete upon execution of step 1511, wherein an MRqstGen Register in iPrioCam is set to generate request signals for each fan-out of the selected multicast cell.

Multicast Iteration and Multicast Cell Transfer Stages

Multicasting Cells for Transfer by a Crossbar Switch

With reference to FIG. 13, an exemplary process 1700 effectuates multicasting of data cells for transfer by a crossbar switch, according to an embodiment of the present invention. Process 1700 can be implemented using a multicast control system (e.g., multicast control system 1300; FIG. 13) and other components of a CamQ architecture (e.g., of system 100; FIG. 1). Process 1700 begins with step 1701, wherein a new MCast cell is received.

The payload of the MCast cell is stored in an ingress queue at a particular address, and the MCast cell has an assigned priority. In step 1702, this address and priority is registered (e.g., the MCast cell is queued in an mStore register such as register 1399, mStore 1306; FIG. 13). In step 1703, the flow of the MCast cell is controlled.

In step 1704, a MCast service request is asserted. In step 1705, MCast service is granted, based upon a request priority comparison. In this request priority comparison, the priorities of the asserting cell and the priorities of any other MCast cells asserting a service request are compared (e.g., by a comparator) and the MCast cell with the highest priority is selected for servicing. Upon selection, in step 1706, MCast service is granted (e.g., by a grant generator) to the in Port at which the selected MCast cell is registered.

In step 1707, at the Mcast service-granted port, request signals are generated for each multicasting fan-out of the selected MCast cell; other input ports generate requests for unicast cells, as in the normal case. In step 1708, each affected ePort gives a grant signal to the inport. The ePorts generate a grant to the Mcast cell first, such as by pre-setting its preference pointer (e.g., preference pointer 488; FIG. 4A) to ensure receiving the servicing Mcast cell. Process 1700 is complete upon execution of step 1709, wherein the crossbar switch is reconfigured for the multicasting accordingly.

Multicasting

Figure 14:
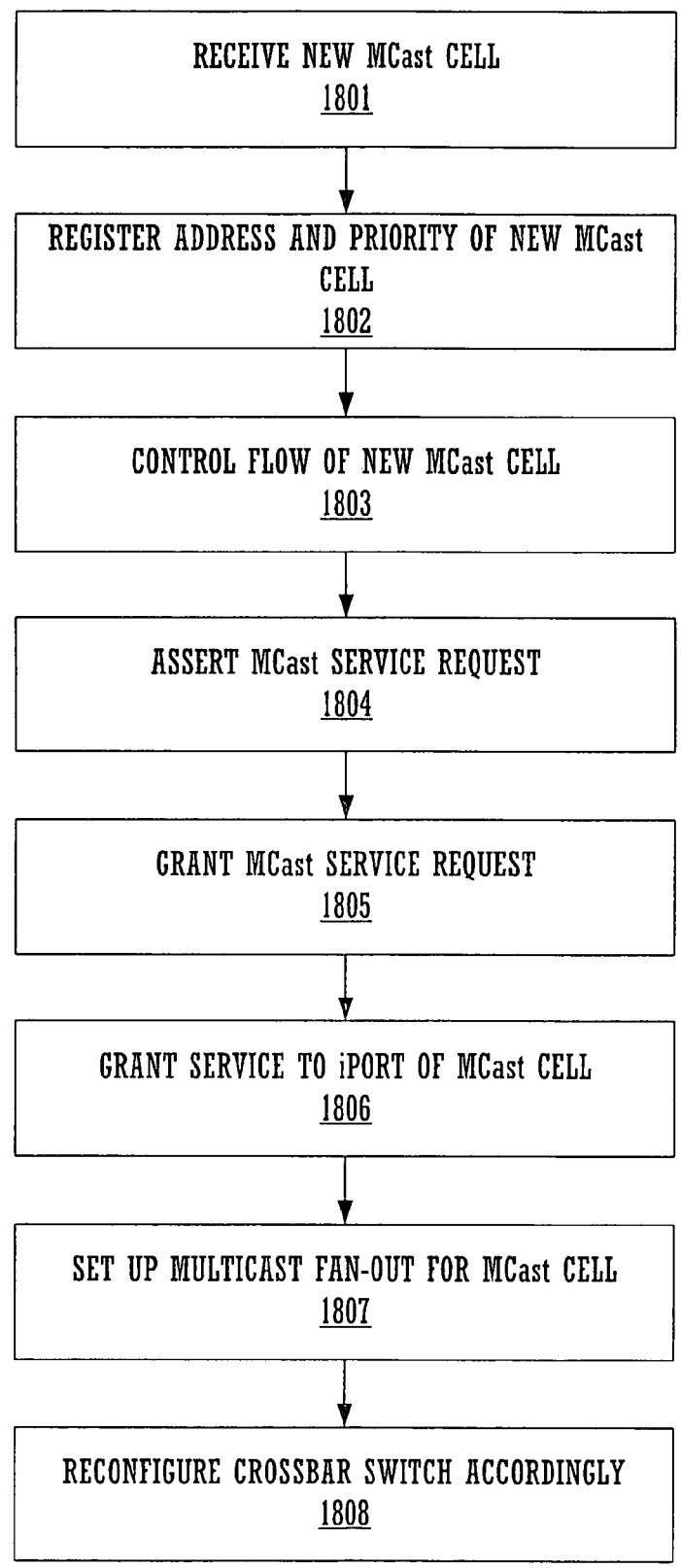
FIG. 14 is a flow chart of an exemplary process for multicasting a data cell for transfer by a crossbar switch, according to an embodiment of the present invention.

With reference to FIG. 14, a process 1800 effectuates multicasting of data cells, according to an embodiment of the present invention. Process 1800 can be implemented using a multicast control system (e.g., multicast control system 1300; FIG. 13) and other components of a CamQ architecture (e.g., of system 100; FIG. 1). Process 1800 begins with step 1801, wherein a new MCast cell is received.

In step 1802, the address and priority of the new MCast cell is registered. In step 1803, flow of the MCast cell is controlled. In step 1804, a MCast service request is asserted. Responsively, in step 1805, the MCast service request is granted.

In step 1806, service is granted to the in Port at which the MCast cell is registered. In step 1807, the multicast fan-out is arranged (e.g., requests are made to the affected ePorts, and the ePorts grant the requests). Process 1800 is complete upon execution of step 1808, wherein an associated switch is reconfigured accordingly to switch the MCast data. In one embodiment, the switch is a crossbar switch.

Section II

Figure 15:
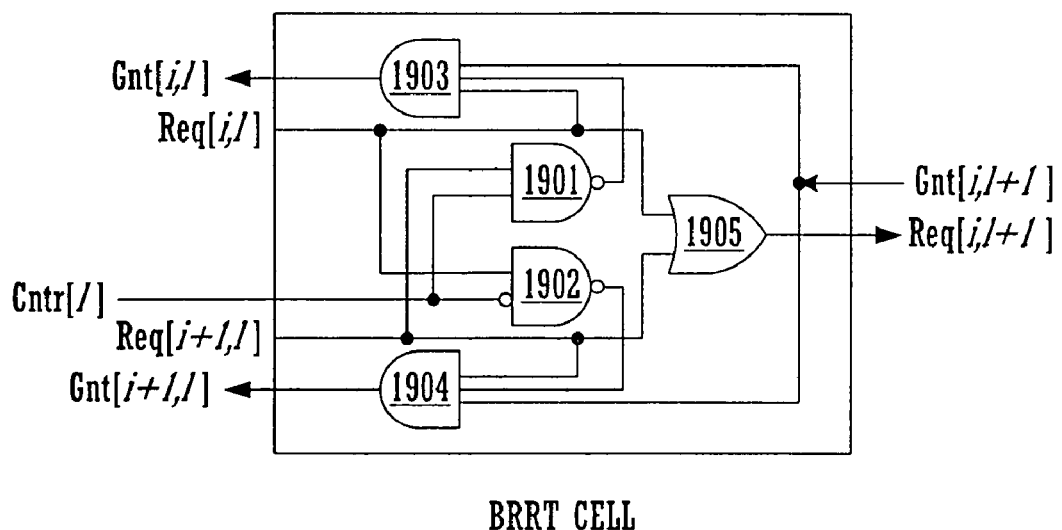
FIG. 15 depicts a basic BRRT cell, according to an embodiment of the present invention.

Preference Programmable First-One Detector and Quadrature Based Random Grant Generator Exemplary Basic BRRT Cell and BRRT Structure
Exemplary Basic BRRT Cell FIG. 15 depicts a basic cell 1900 which can be combined with others to comprise a binary round robin tree (BRRT) cell structure which can be programmed for switching service grant selection to achieve urgency based weighted round robin (UWRR) flow control, according to one embodiment of the present invention.

A signal 'Sig[i, l]' represents the i-th signal at a level l. A first service request signal 'Req[i, l]' is received at inputs of 'OR' gate 1905, 'AND' gate 1903, and 'AND' gate 1902. A second service request signal 'Req[i+1, l]' is received at inputs of 'OR' gate 1905, 'AND' gate 1904, and 'AND' gate 1901. 'OR' gate 1905 combines request signals 'Req[i,l]' and 'Req[i+1, l]' to generate a request 'Req[i, l+1]'.

A grant request signal 'Gnt[i, l+1]' is received by 'AND' gates 1903 and 1904. 'AND' gate 1901 receives an uninverted control signal 'Cntr[l]' as a second input. 'AND' gate 1902 receives an inverted (e.g., symbolized herein by '~') control signal '~Cntr[l]' as a second input. The outputs of 'AND' gates 1901 and 1902 are inverted and provided as inputs to 'AND' gates 1903 and 1904, respectively. In response to their various inputs, 'AND' gates 1903 and 1904 generate service grant signals 'Grnt[i, l]' and 'Grnt[i+1, l]', respectively, according to the following signal combinations:

Gnt[i, l]=Req[i,l]*Grnt[i, l+1]*~(Req[i+1, l]*Cntr[l]); and

Grnt[i+1, l]=Req[i+1, l]*Grnt[i, l+1]*~(Req[i, l]*~Cntr [l]).

Exemplary BRRT Structure

Figure 16A:
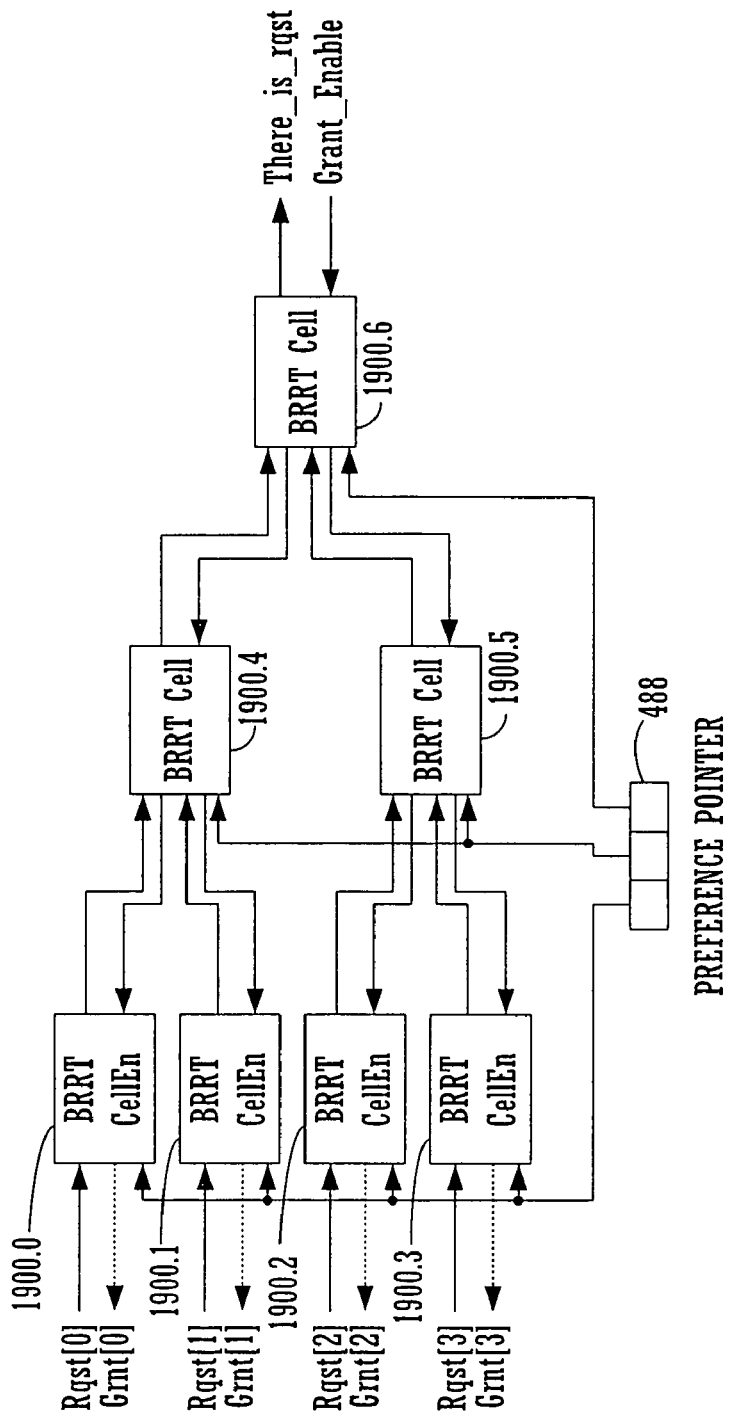
FIG. 16A depicts the basic structure of a BRRT, according to an embodiment of the present invention.
Figure 19:
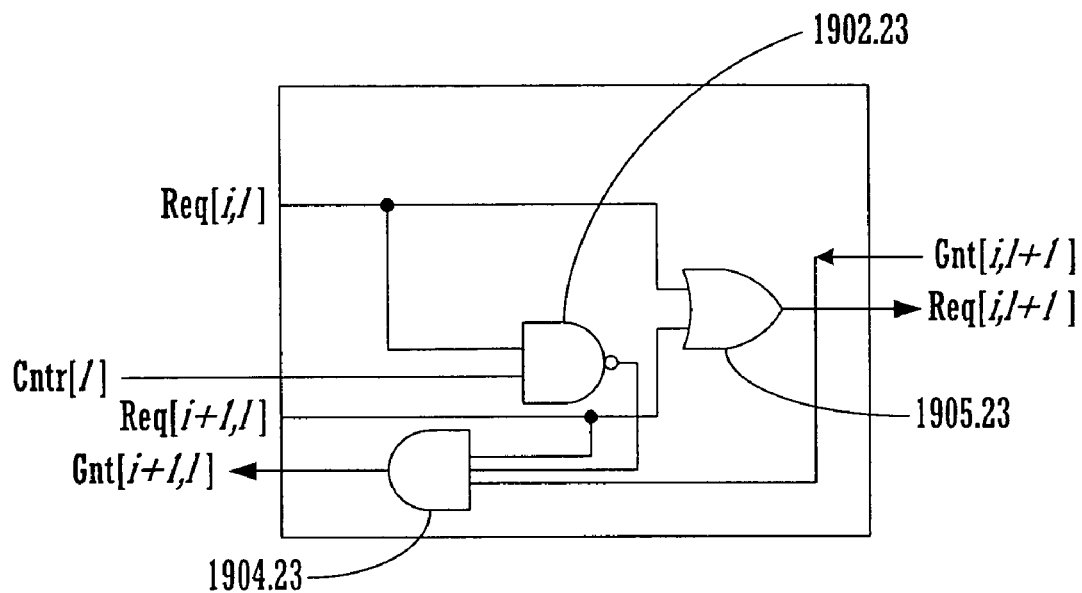
FIG. 19 depicts a BRRT cell, with a single grant, according to an embodiment of the present invention.

FIG. 16A depicts a BRRT structure 2000, wherein a number of basic BRRT cells (e.g., BRRT cell 1900; FIG. 19), including BRRT cells with 'Enable' signals (e.g., BRRTen cells with 'Enable' 1903.22; FIG. 19) are combined in one embodiment to achieve a preference programmable first-one detector service granting functionality. Requests for service 'Rqst[0]' through 'Rqst[3]' are received by BRRT cells with 'Enable' signals 1900.0-1900.3, respectively. BRRT cells 1900.0-1900.3 serve as BRRT-Enable cells.

Outputs of BRRT cells with 'Enable' signals 1900.0 and 1900.1 become inputs to BRRT cell 1900.4. Outputs of BRRT cells with 'Enable' signals 1900.2 and 1900.3 become inputs to BRRT cell 1900.5. Outputs of BRRT cells 1900.4 and 1900.5 become inputs to BRRT cell 1900.6, which generates a 'There_is_rqst' signal as an output.

Preference pointer 488 provides control signals (e.g., control signal 'Cntr[l]'; FIG. 19) to each of BRRT cells 1900.0-1900.6. Preference pointer 488 thus controls the switching selection sequence '(Seq ^ PrefPtr)' according to Table 3, below. It is appreciated that the preference pointer can give a selection preference on the grant output signal.

TABLE 3

| Preference Pointer | Selection Sequence '(Seq (0 -> 1 -> 2 -> 3 -> 4 -> 5 -> 6 -> 7)^ PrefPtr)' |
|---|---|
| 0(000) | 0 -> 1 -> 2 -> 3 -> 4 -> 5 -> 6 -> 7 |
| 1(001) | 1 -> 0 -> 3 -> 2 -> 5 -> 4 -> 7 -> 6 |
| 2(010) | 2 -> 3 -> 0 -> 1 -> 6 -> 7 -> 4 -> 5 |
| 3(011) | 3 -> 2 -> 1 -> 0 -> 7 -> 6 -> 5 -> 4 |
| . | . |
| . | . |
| . | . |
| 7(111) | 7 -> 6 -> 5 -> 4 -> 3 -> 2 -> 1 -> 0 |

Figure 16B:
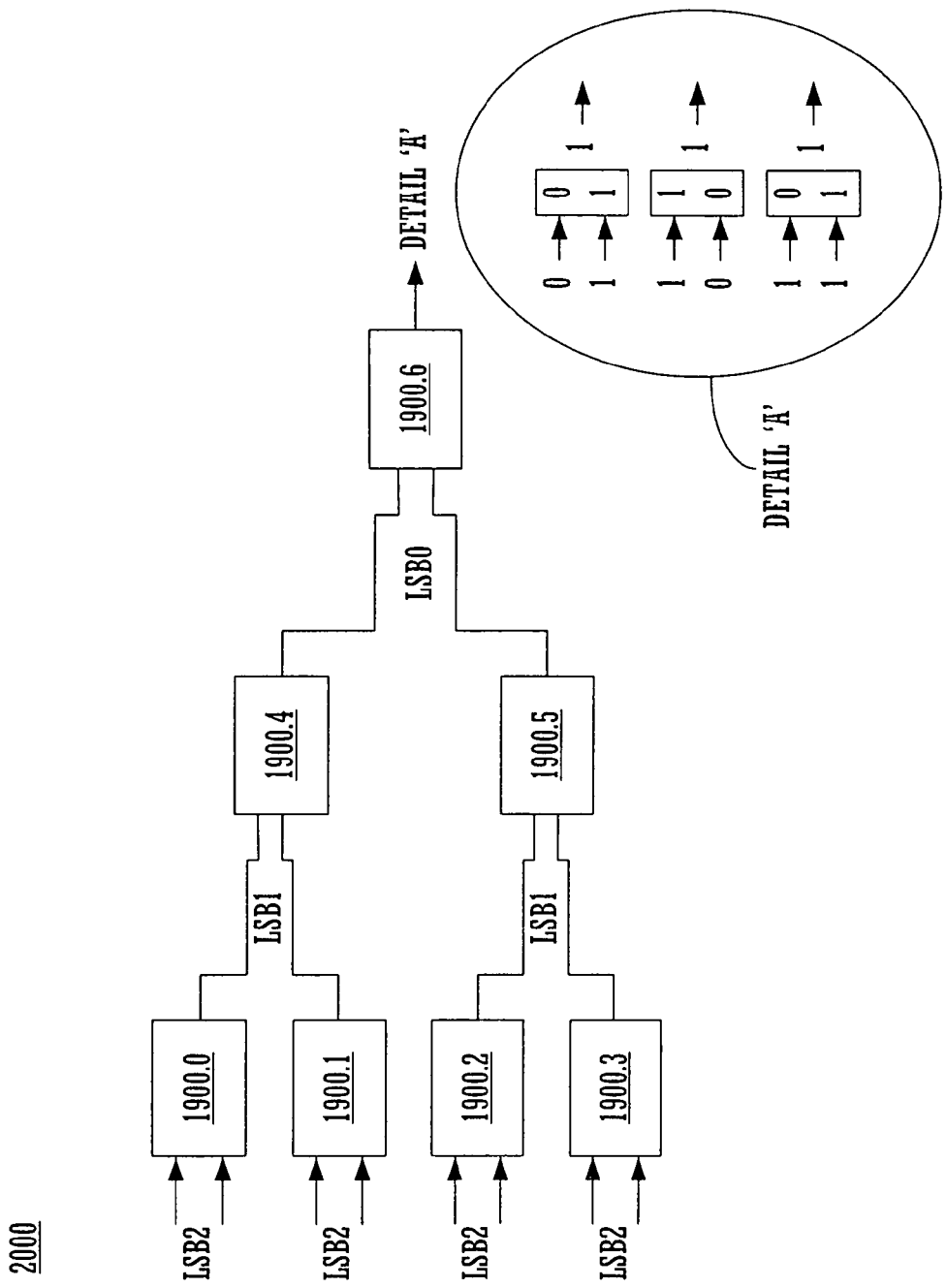
FIG. 16B depicts another BRRT, according to an embodiment of the present invention.

With reference to FIG. 16B, it is seen that a LSB level '2' enters each of BRRTen cells 1900.0 through 1900.3. BRRTen cells 1900.0 and 1900.1 then provide a LSB level '1' to BRRT cell 1900.4. In a similar fashion, BRRTen cells 1900.2 and 1900.3 then provide a LSB level '1' to BRRT cell 1900.5. BRRTen cells 1900.4 and 1900.5 then provide a LSB level '0' to BRRT cell 1900.6. Detail 'A' of FIG. 20B shows that BRRT cell 1900.6 then provides a '1' output for a level '0' LSB input containing any '1'; its output would be a '0' only for a level '0' LSB input of all '0' values. In one embodiment, pseudo random grant signal generation is effectuated by a simple ripple counter of reversed bit order (e.g., 2412), which can serve (e.g., function as) the preference pointer.

Figure 16C:
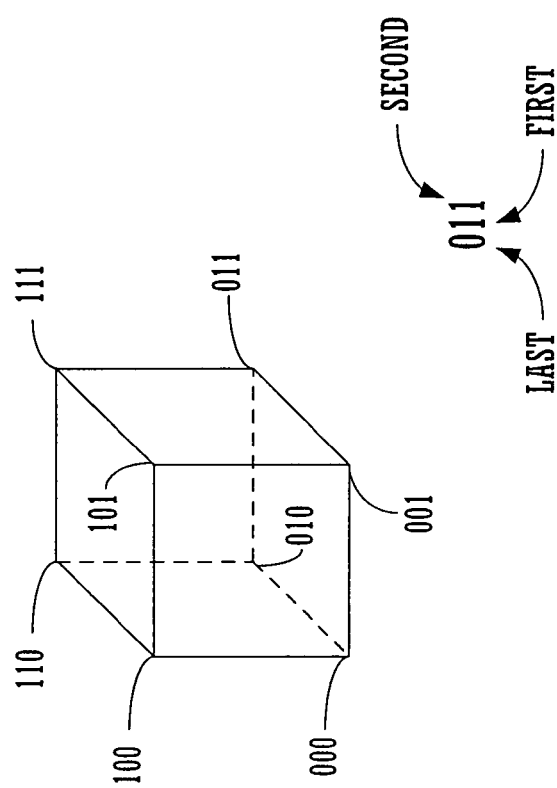
FIG. 16C depicts a cubical count field, according to an embodiment of the present invention.

With reference to FIG. 16C, a cubical count value field 2550 generated by BRRT 2400 has binary values '000' through '111' at each of is vertices. These count values serve in one embodiment as tie-breakers for determining egress priority. The digit in the lowest value place is counted first. The digit in the second value place is counted second. The digit in the highest value place is counted last. Each counting priority specifies a switching pathway, in the crossbar switch (e.g., crossbar switch 100; FIG. 1) upon which BRRT 2400 is deployed, that is the preferred pathway. Counting order is maintained by counting along the ordinal axes of field 2500 (e.g., counting is performed along the present axis first, before progressing).

BRRT structure 2000 thus provides fast one-hot selection featuring a 0(Log 2 (n)) process. Advantageously, this 0(Log 2 (n)) process achieves programmable preference, which is more difficult to achieve with architectures using conventional 0(n) algorithms. BRRT structure 2000 allows implementation of random selection by counter, in one embodiment by bit reversal. BRRT structure 2000 can be used in a grant generator (e.g., grant generator 129; FIG. 1) and for 'Write address' signal generation with a one-hot vacancy vector.

Exemplary Egress BRRT Structure

Another Exemplary Basic BRRT Cell

Figure 17:
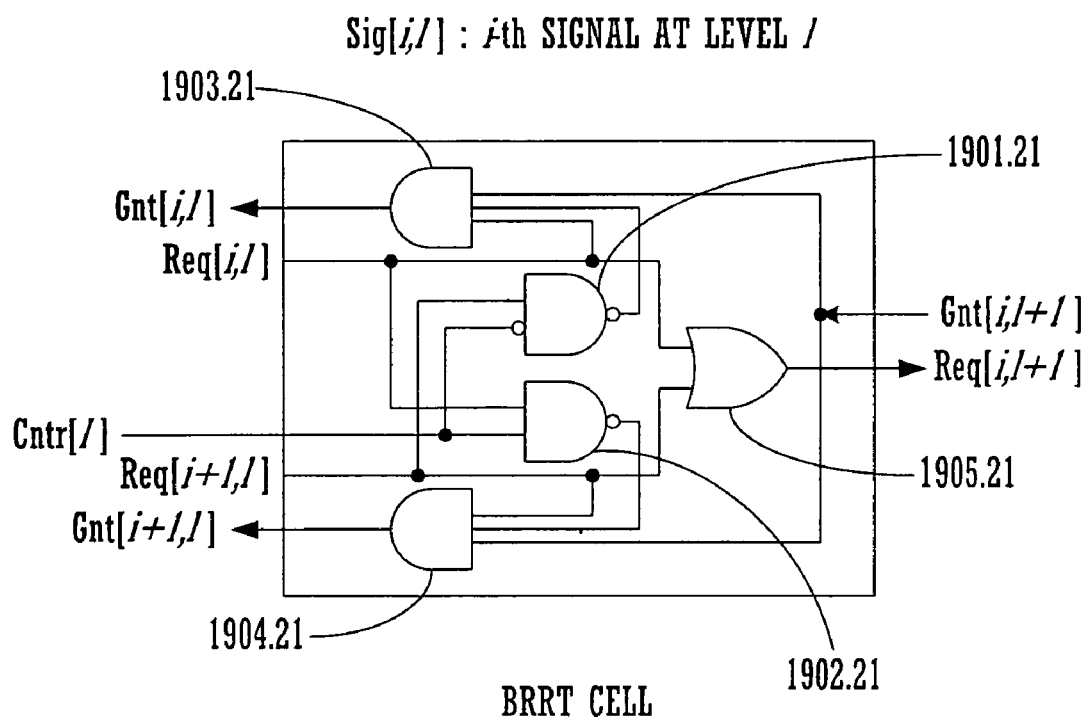
FIG. 17 depicts another BRRT cell, according to an embodiment of the present invention.

FIG. 17 depicts another exemplary basic cell 1900.21, according to one embodiment of the present invention. A signal 'Sig[i, l]' again represents the i-th signal at a level l. A first service request signal 'Req[i, l]' is received at inputs of 'OR' gate 1905.21, 'AND' gate 1903, and 'AND' gate 1902.21. A second service request signal 'Req[i+1, l]' is received at inputs of 'OR' gate 1905.21, 'AND' gate 1904.21, and 'AND' gate 1901.21. 'OR' gate 1905 combines request signals 'Req[i, l]' and 'Req[i+1, l]' to generate a request 'Req[i, l+1]'.

A grant request signal 'Gnt[i, l+1]' is received by 'AND' gates 1903.21 and 1904.21. 'AND' gate 1902.21 receives an uninverted control signal 'Cntr[l]' as a second input. 'AND' gate 1901.21 receives an inverted (e.g., symbolized herein by '~') control signal '~Cntr[l]' as a second input. The outputs of 'AND' gates 1901.21 and 1902.21 are inverted and provided as inputs to 'AND' gates 1903.21 and 1904.21, respectively. In response to their various inputs, 'AND' gates 1903.21 and 1904.21 generate service grant signals 'Grnt[i, l]' and 'Grnt[i+1, l]', respectively, according to the following signal combinations:

Gnt[i, l]=Req[i, l]*Grnt[i, l+1]*~(Req[i+1, l]*~Cntr[l]); and

Grnt[i+1, l]=Req[i+1, l]*Grnt[i, l+1]*~(Req[i, l]*Cntr[l]).

Exemplary BRRT Cell with 'Enable'

Figure 18:
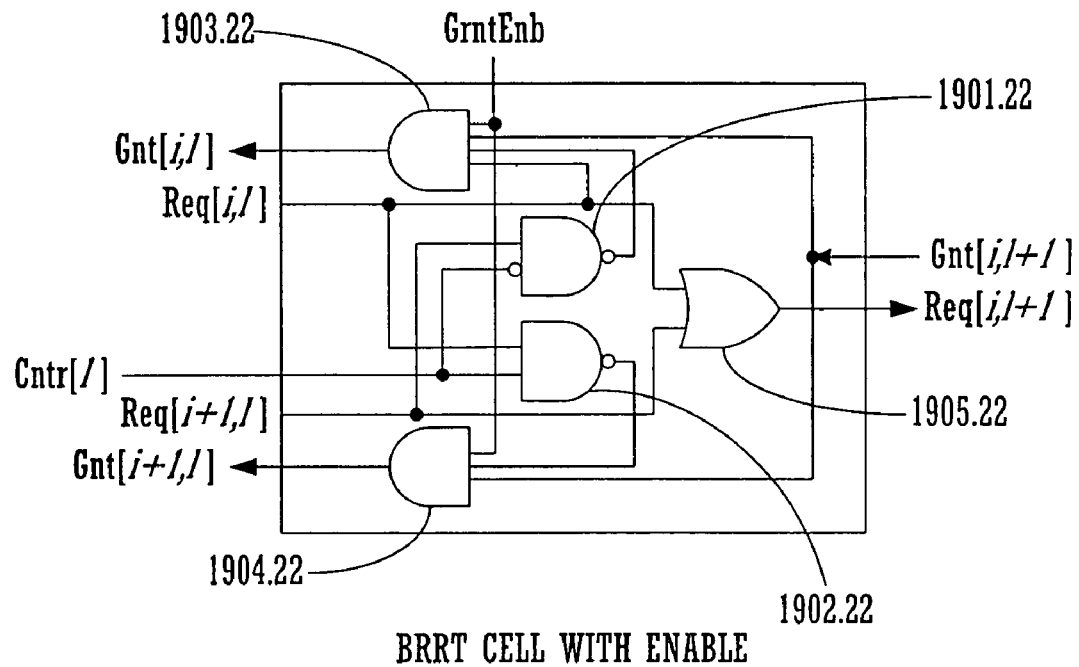
FIG. 18 depicts a BRRT cell, with 'Enable', according to an embodiment of the present invention.

FIG. 18 depicts a basic cell 1900.22 with 'Enable' signal (e.g., BRRTen), according to one embodiment of the present invention. A grant enable signal 'GrntEnb' is received as a fourth input to 'AND' gates 1903.22 and 1904.22. A first service request signal 'Req[i,l]' is received at inputs of 'OR' gate 1905.22, 'AND' gate 1903.22, and 'AND' gate 1902.22. A second service request signal 'Req[i+1, l]' is received at inputs of 'OR' gate 1905.22, 'AND' gate 1904.22, and 'AND' gate 1901.22. 'OR' gate 1905.22 combines request signals 'Req[i, l]' and 'Req[i+1, l]' to generate a request 'Req[i, l+1]'.

A grant request signal 'Gnt[i, l+1]' is received by 'AND' gates 1903.22 and 1904.22. 'AND' gate 1901.22 receives an inverted (e.g., symbolized herein by '~') control signal '~Cntr[l]' as a second input. 'AND' gate 1902.22 receives an uninverted control signal 'Cntr[l]' as a second input. The outputs of 'AND' gates 1901.22 and 1902.22 are inverted and provided as inputs to 'AND' gates 1903.22 and 1904.22, respectively. In response to their various inputs, 'AND' gates 1903.22 and 1904.22 generate service grant signals 'Grnt[i, l]' and 'Grnt[i+1, l]', respectively, according to the following signal combinations:

Gnt[i, l]=GrntEnb*(Req[i, l]*Grnt[i, l+1]*~(Req[i+1, l]*~Cntr[l])); and

Grnt[i+1, l]=GrntEnb*(Req[i+1, l]*Grnt[i, l+1]*~(Req[i, l]*Cntr[l])).

Exemplary BRRT Cell with Single Grant

FIG. 19 depicts a BRRT cell 1900.23 with a single grant signal 'Grnt[i, l+1]', according to one embodiment of the present invention. A first service request signal 'Req[i, l]' is received at inputs of 'OR' gate 1905.23 and 'AND' gate 1902.23. A second service request signal 'Req[i+1, l]' is received at inputs of 'OR' gate 1905.22 and 'AND' gate 1904.23. 'OR' gate 1905.23 combines request signals 'Req[i, l]' and 'Req[i+1, l]' to generate a request 'Req[i, l+1].

A grant request signal 'Gnt[i, l+1]' is received by 'AND' gate 1904.23. 'AND' gate 1902.23 receives an uninverted control signal 'Cntr[l]' as a second input. The outputs of 'AND' gate 1902.23 is inverted and provided as an input to 'AND' gate 1904.23. In response to its various inputs, 'AND' gate 1904.23 generates a service grant signal 'Grnt[i+1, l]' according to the signal combination:

Grnt[i+1, l]=(Req[i+1, l]*Grnt[i, l+1]*~(Req[i, l]*Cntr[l]).

Exemplary Egress BRRT_DxS Structure

FIG. 20 depicts an Egress BRRT (eBRRT) structure 2400, according to one embodiment of the present invention. The eBRRT structure 2400 is a Egress side BRRT for a destination 'X' at a plane 'S'. 'X' comprises a positive whole number between 0 and 31. Plane 'S' corresponds toplane index 0 (q-plane), 1 (r-plane), 2 (s-plane), or 3 (t-plane). Each plane has corresponding input ports. For instance, s-plane (plane index 2) has input 16, 17, . . . , 23 (e.g., '2(2'b10)'). The eBRRT structure 2400 is effectively a cascade of BRRT cells controlled by a preference pointer 488.

The eBRRT structure 2400 is quadrature based. Thus, referring to plane index 2450 of FIG. 24, other quadrants represent planes 'Q', 'R', and 'T'. Plane 'Q' corresponds to Ingress ports 0-7 (e.g., '0(2'b00)'). Plane 'R' corresponds to Ingress ports 8-15 (e.g., '1(2'b01)'). Plane 'T' corresponds to Ingress ports 24-31 (e.g., '3(2'b11)'). Egress backpressure 'eBP[x]' represents egress back pressure accruing to a crossbar output queue 'XOQ[x]'. This can occur if crossbar output queue 'XOQ[x]' is full or if it is disabled.

Preference pointer 488 is responsive to the output of MUX 2409, which is controlled by multicast select signal "Mcast-Sel'. MUX 2409 multiplexes a multicast pointer signal 'McastPointr', and the output of MUX 2410, which is controlled by number of ports configuration signals 'NumPrt-Conf[1:0]'. Signals 'NumPrtConf[1:0]' can have four counter values corresponding to port configurations as follows:

| | | |
|---|---|---|
| 0(32 × 32): | cntr[4:0]: | (32 input ports, 32 output ports) |
| 1(16 × 16): | (cntr[3:0], 1'b0) | (16 input ports, 16 output ports) |
| 2(8 × 8): | (cntr[2:0], 2'b0) | (8 input ports, 8 output ports) |
| 3(4 × 4): | (cntr[1:0], 3'b0) | (4 input ports, 4 output ports). |

MUX 2410 multiplexes several (e.g., four) signals from a counter 2411, which takes an input from ripple counter register 2412. Ripple counter register 2412 registers an initial counter value. Whenever destination x was chosen for receiving data, the ePort chosen [x] toggles and causes the ripple counter to advance. Register 2413 also provides an egress port chosen delay signal 'ePortChsenDly[x]'.

Again considering eBRRT structure 2400 for a destination 'X' at a plane 'S', request for switching service signals 'req[16, x]' and 'req[17, x]' are received as inputs by BRRTen cell 1900.22A. Similarly, signals 'req[18, x]' and 'req[19, x]' are received as inputs by BRRTen cell 1900.22B, signals 'req[20, x]' and 'req[21, x]' are received as inputs by BRRTen cell 1900.22C, and signals 'req[22, x]' and 'req[23, x]' are received as inputs by BRRTen cell 1900.22D.

Signals 'req[6, x]' through 'req[23, x]' also provide the inputs to OR Gate 2401, which generates a request summary output quadrant signal 'reqSumOutQ[x]'. Signal 'reqSumOutQ[x]' is combined with a signal request summary input quadrant signal 'reqSumInQ[x]' from a neighboring quadrature plane by OR gate 2402, the output of which provides a request summary output halfplane signal 'reqSumOutQQ[x]'.

BRRTen cells 1900.22A through 1900.22D receive request signals of the form 'req[i, x]', which represent a request from an i-th inport to an x-th destination. BRRTen cells 1900.22A through 1900.22D generate grant signals of the form 'gnt[x, 1]', which represent grants from the x-th destination to the i-th inport.

Signal 'reqSumInQQ[x]' represents an 'OR' term of all of the requests to a destination 'x' from planes 'q' and 'r'. Signal 'reqSumInQ[x]' represents an 'OR' term of all of the requests to destination 'x' from plane 't'. Signal 'reqSumOutQ[x]' represents an 'OR' term of all of the requests to destination 'x' from plane 's'. Signal 'reqSumOutQQ[x]' represents an 'OR' term of all of the requests to a destination 'x' from planes 's' and 't'. Vdd is provided to BRRTsng cell 1900.23A, if it is not configured to give no grant.

BRRTen cells 1900.22A through 1900.22D receive an 'Enable' signal from the output of 'AND' gate 2403. The inputs to 'AND' gate 2403 comprise a grant signal (e.g., signal 'Gnt[l+1, 1]'; FIG. 23) from BRRTSng cell 1900.23B. and an egress port chosen signal 'ePortChsen[x]', delivered through inverter 2403.

BRRTen cells 1900.22A and 1900.22B send requests to and receive grants from BRRT cell 1900.21A. BRRTen cells 1900.22C and 1900.22D send requests to and receive grants from BRRT cell 1900.21B. BRRT cells 1900.21A and 1900.21B send requests to and receive grants from BRRT cell 1900.21C. BRRT cell 1900.21C sends requests to and receive grants from BRRTsng cell 1900.23A, which sends a request to BRRTsng cell 1900.23B.

Thus, a cascade is formed wherein BRRTen cells 1900.22A and 1900.22B comprise the first half of a first stage, BRRTen cells 1900.22C and 1900.22D comprise the second half of the first stage, BRRT cells 1900.21A and 1900.21B comprise a second stage, and BRRT cells 1900.21C, 1900.23A, and 1900.23B each comprise a third, fourth, and fifth stage, respectively. The first half of the first stage "cascades into" cell 1900.21A. The second half of the first stage cascade into cell 1900,21B. The second stage cascades into the third stage, the third into the fourth, and the fourth into the fifth stage.

In one embodiment, where there is any active request to grant generator 2400, it will give only one grant, upon which another grant will not be given. This function is implemented in the present embodiment by OR gate 2405, and registers 2406 and 2407. In the present embodiment, when 'im1iNoGrant[x] is activated, the grant is disabled for the duration of its activation.

BRRTsng cell 1900.23B sends a request to 'AND' gate 2408, which provides an output to register 2407. The output of 'AND' gate 2408 is registered by register 2407 and inverted to provide a second input back to 'AND' gate 2408, as well as an input to 'OR' gate 2405. A second input to 'OR' gate 2405 is provided by an 'im1iNoGrnt[x]' signal, registered by register 2406.

Preference pointer 488 provides control signals (e.g., signal 'Cntr[1]') to BRRT cells 1900.22A through 1900.23B. The control signal provided to BRRTsng cell 1900.23A is inverted. Preference pointer 488 signals to BRRTsng cells 1900.23A and 1900.23B to provide quadrature based round robin grant generation according to the following schedule:

Plane q (2'b00):
  Pointer[4]=~PtrInput[4];
  Pointer[3]=~PtrInput[3];
Plane r (2'b01):
  Pointer[4]=~PtrInput[4];
  Pointer[3]=PtrInput[3];
Plane s (2'b01):
  Pointer[4]=PtrInput[4];
  Pointer[3]=~PtrInput[3]; and
Plane t (2'b01):
  Pointer[4]=PtrInput[4];
  Pointer[3]=PtrInput[3].

Exemplary Grant Generation Structure at Plane

Figure 21:
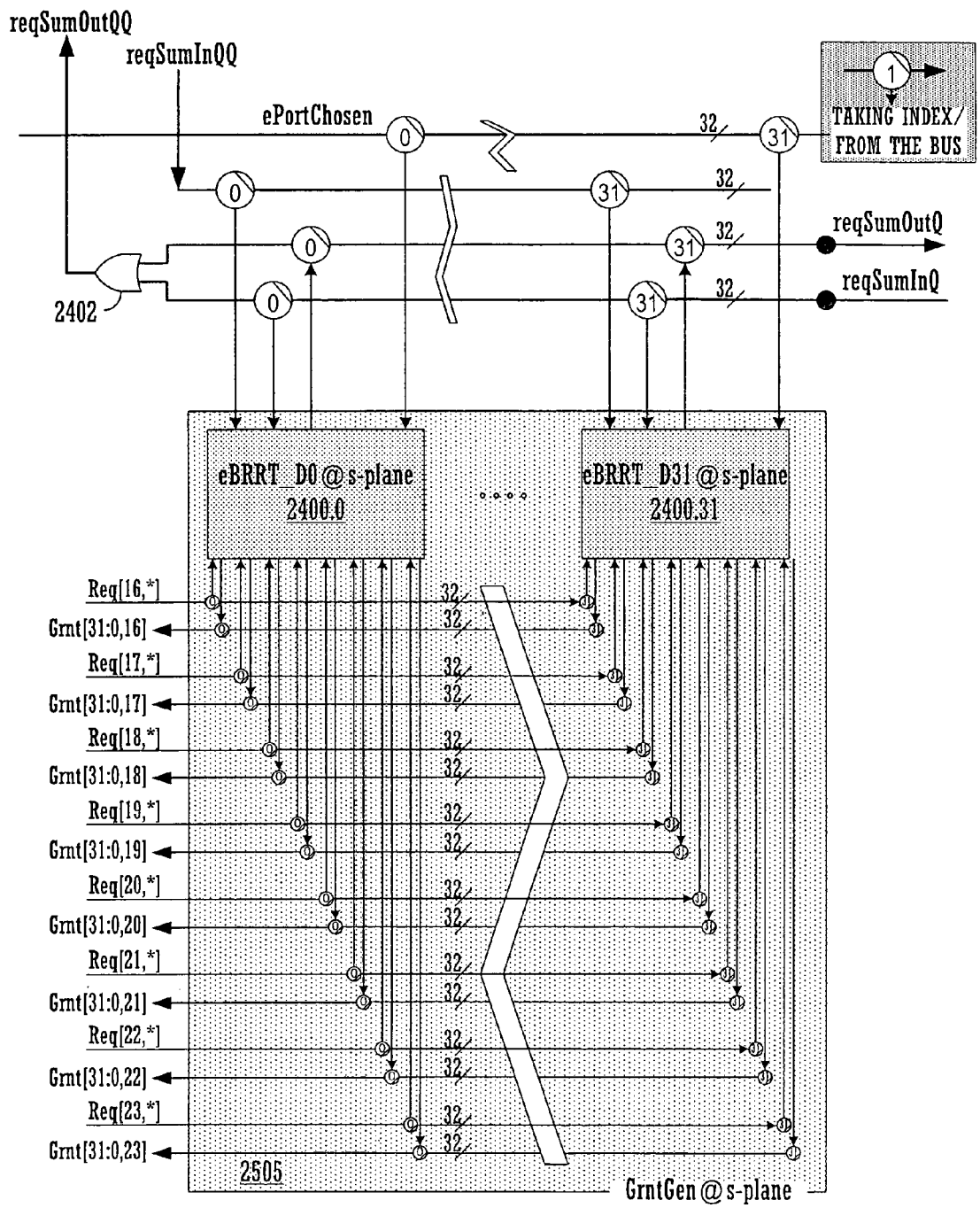
FIG. 21 depicts a grant generator structure, according to an embodiment of the present invention.

FIG. 21 depicts a grant generation structure 2500 at a plane 's', according to one embodiment of the present invention. Signals 'reqSumInQQ', 'ePortChosen', and 'reqSumInQ' are provided in one embodiment to each of 32 eBRRT structures (e.g., eBRRT structure 2400; FIG. 24) 2400.0 through 2400.31. From each of eBRRT structures 2400.0 through 2400.31, a 'reqSumOutQ' signal is received. Signals 'reqSumInQ' and 'reqSumOutQ' comprise inputs to 'OR' gate 2402, the output of which comprises signal 'reqSumOutQQ'.

Within 'GrntGen@s-plane' 2505, each of eBRRT structures 2400.0 through 2400.31 receives requests 'req[16, *]' through 'req[23, *]' and generates grants 'grnt[31:0, 16]' through 'grnt[31:0, 23]'. Similar eBRRT structures comprise planes 'q', 'r', and 't'. Each of the four quadrants services eight ports, effectively providing a 32-port crossbar switch. However, since signals, requests, and grants are summed and provided to each eBRRT structure, and a preference pointer (e.g., preference pointer 488; FIGS. 4A, 24) associates the eBRRT structure sequentially with each plane (e.g., quadrant), separate eBRRT structures for each plane are obviated. Advantageously, this provides a savings in hardware required to effectuate the 32-port switch, as compared with conventional approaches.

Exemplary Process

Figure 22:
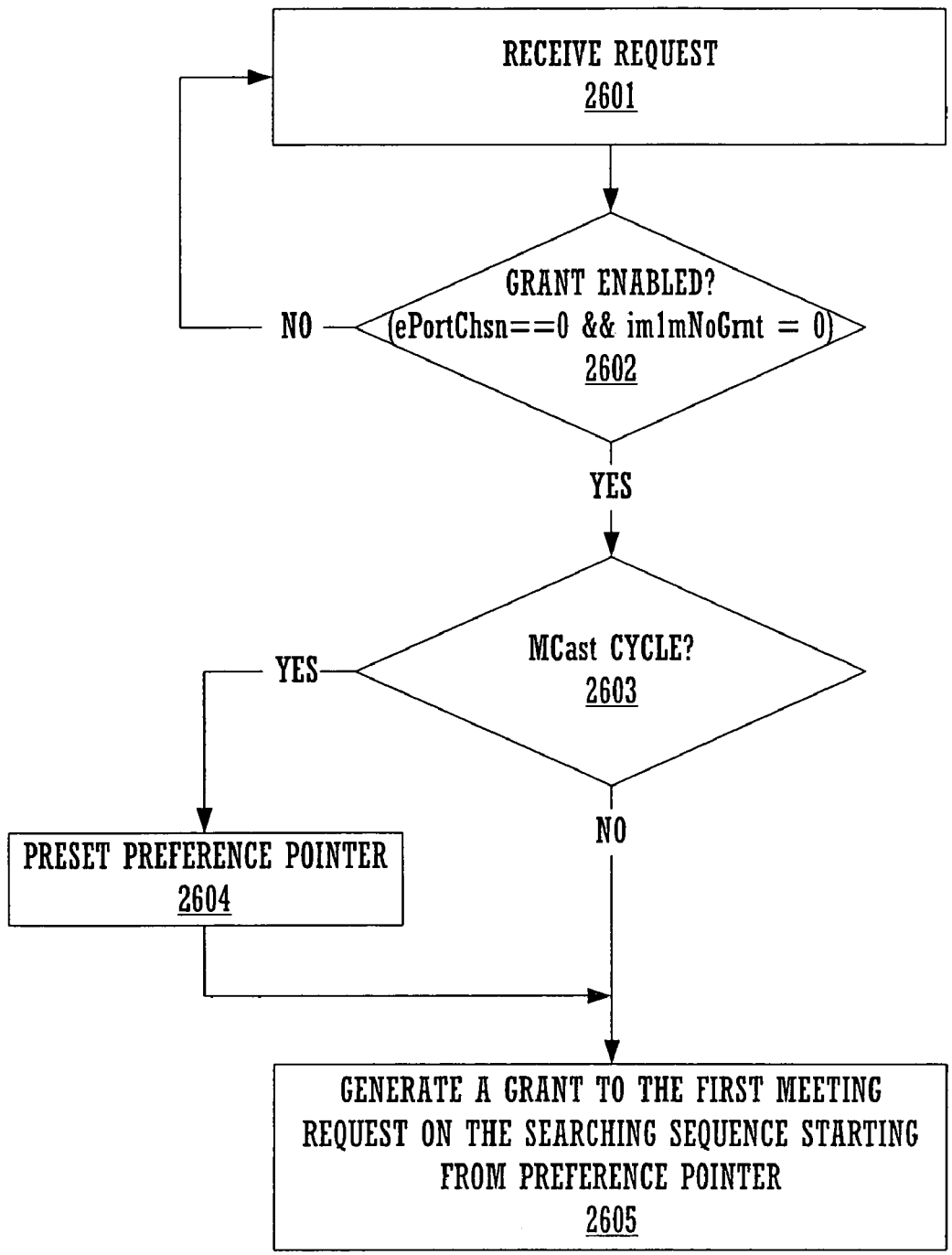
FIG. 22 is a flowchart of the steps in a process for quadrature based round robin grant generation, according to one embodiment of the present invention.

FIG. 22 is a flowchart of a process 2600 for quadrature based round robin grant generation, according to one embodiment of the present invention. Process 2600 begins with step 2601, wherein a request for switching service is received, e.g., at the eBrrt_Di@s-plane (FIG. 22), where "Di s-plane" means eBrrt at s-plane corresponding to an out port destination of i.

In one embodiment, requests from input ports go to the eBrrts corresponding to their quadrants. Advantageously, this reduces routing complexity. As there are 32×8 request lines to the out port destinations from all of the input prts in the quadrant, each quadrant implements the 32 eBrrt_Di (i=0, 1, . . . , 31), corresponding to each out port. Each eBrrt receives 8 request lines. Each eBrrt takes one corresponding request line among 32 request lines from an input port, as depicted in FIG. 21.

In step 2602, the eBrrts check to determine if they can generate a grant signal. If the out port i of eBrrt_Di has already decided to take a cell (e.g., ePortChsn=1; FIG. 21), or 'im1iNoGrant' (FIG. 21) is set, then a grant cannot be generated while the condition persists. If a grant can be generated, process 2600 proceeds to step 2603.

In step 2603, it is determined whether an Mcast cycle is servicing. If so, the preference pointer (e.g., preference pointer 2409; FIG. 22) is preset to ensure that a grant signal is generated on anMCast request. Upon presetting the preference pointer (or if an Mcast cycle is not being serviced), process 2600 proceeds to step 2605.

In step 2605, a grant is generated to the first meeting request on the searching sequence, starting from the preference pointer. In one embodiment, a single grant is generated corresponding to out port i by the four eBrrts of eBrrt_Di@-plane. In one embodiment, this is effectuated in part by signals reqSumInQ and reqSumInQQ (FIG. 21). These reqSum signals indicate that there is at least one request at each neighboring quadrant and a half. This completes process 2600.

Thus a preference programmable first-one detector and quadrature based random grant generator in a crossbar switch is disclosed. In one embodiment, the crossbar switch emulates a FIFO switching function in a single chip crossbar switch architecture that operates at a high switching speed with a large bandwidth and supports multiple QoS levels, yet do not demand an inordinately large number of input and output queues or otherwise excessively tax memory requirements. The system and method operate at a high switching speed with a large bandwidth and support multiple QoS levels, yet do not require a complex pointer management system, nor constrain switching speeds and bandwidth capacity therein. The system and method efficiently select data for switching within a crossbar switch based structure based on an urgency counter based WRR grant selection. This switching is achieved with economy of hardware by quadrature basing and quadrature preference selection.

The foregoing descriptions of specific embodiments of the present invention have been presented for purposes of illustration and description. They are not intended to be exhaustive or to limit the invention to the precise forms disclosed, and many modifications and variations are possible in light of the above teaching. The embodiments were chosen and described in order to explain the principles of the invention and its practical application, to thereby enable others skilled in the art to utilize the invention and various embodiments with various modifications as are suited to the particular use contemplated. It is intended that the scope of the invention be defined by the Claims appended hereto and their equivalents.

What is claimed is:

1. A grant generator for switching service section, comprising:
   a structure comprising a plurality of binary round robin tree (BRRT) cells, each BRRT cell having one or more request inputs and a request output, a grant input and one or more grant signal outputs, and a control signal input, each of the BRRT cells providing a request output to another BRRT cell or to a final request output for the structure; and
   a preference pointer coupled to the plurality of BRRT cells wherein the preference pointer is to provide one or more control signals to each of the BRRT cells at the control signal input of each BRRT cell.

2. The grant generator as recited in claim 1, wherein the grant generator is a functionality within a crossbar switch structure.

3. The grant generator as recited in claim 1, wherein the grant generator comprises a quadrature based grant generator.

4. The grant generator as recited in claim 3, wherein the quadrature based grant generator services four quadrants.

5. The grant generator as recited in claim 4, wherein each of the four quadrants corresponds to a plurality of ports, wherein each quadrant comprises a plane, and wherein the structure is expressed within each plane.

6. The grant generator as recited in claim 4, wherein the plurality of ports comprises eight ports and wherein a total of 32 ports is serviced.

7. The grant generator as recited in claim 1, wherein each of the plurality of BRRT cells comprises a type selected from the group consisting of 'basic' BRRT cells, 'enable' BRRT cells further including an enabling input, and 'single grant' BRRT cells having a single request input and a single grant output.

8. The grant generator as recited in claim 7, wherein the structure comprises an arrangement of the BRRT cells, and wherein the arrangement comprises a cascade of BRRT cells.

9. The grant generator as recited in claim 8, wherein the cascade comprises:
   a first stage of BRRT cells, wherein the first stage comprises a first even positive whole number of BRRT cells;
   a second stage of BRRT cells coupled to the first stage, wherein the second stage comprises a second even positive whole number of BRRT cells; and
   a third stage of one or more BRRT cells coupled to the second stage.

10. The grant generator as recited in claim 9, wherein a first half of the BRRT cells of the first stage cascades into a first half of the BRRT cells of the second stage.

11. The grant generator as recited in claim 10, wherein a second half of the BRRT cells of the first stage cascades into a second half of the BRRT cells of the second stage.

12. The grant generator as recited in claim 9, wherein the BRRT cells of the second stage cascade into the one or more BRRT cells of the third stage.

13. The grant generator as recited in claim 9, wherein the cascade further comprises a fourth stage of one or more BRRT cells coupled to the third stage.

14. The grant generator as recited in claim 13, wherein the cascade further comprises a fifth stage of one or more BRRT cells coupled to the fourth stage.

15. The grant generator as recited in claim 14, wherein the BRRT cells of the first stage comprise 'enable' BRRT cells.

16. The grant generator as recited in claim 14, wherein the BRRT cells of the second stage and the third stage comprise 'basic' BRRT cells.

17. The grant generator as recited in claim 14, wherein the BRRT cells of the fourth stage and the fifth stage comprise 'single grant' BRRT cells.

* * * * *